United States Patent [19]

Shioya et al.

[11] Patent Number: 5,065,301
[45] Date of Patent: Nov. 12, 1991

[54] SWITCHING POWER SUPPLY

[75] Inventors: Masaki Shioya; Masuo Hanawaka, both of Tokyo, Japan

[73] Assignee: Yokogawa Electric Corporation, Tokyo, Japan

[21] Appl. No.: 548,010

[22] Filed: Jul. 5, 1990

[30] Foreign Application Priority Data

Sep. 22, 1989 [JP] Japan ................... 1-246915
Dec. 26, 1989 [JP] Japan ................... 1-337344
Feb. 28, 1990 [JP] Japan ................... 2-47419
Apr. 23, 1990 [JP] Japan ................... 2-107136

[51] Int. Cl.$^5$ ............................... H02M 3/28
[52] U.S. Cl. ........................... 363/17; 363/16;
363/91; 363/78; 363/132; 333/175; 333/177
[58] Field of Search ............ 363/16, 17, 91, 98,
363/132; 333/175, 177

[56] References Cited

U.S. PATENT DOCUMENTS

| | | | |
|---|---|---|---|
| 1,227,114 | 5/1917 | Campbell | 379/346 |
| 4,336,584 | 6/1982 | Careglio | 363/28 |
| 4,409,647 | 10/1983 | Terkanian | 363/27 |
| 4,415,959 | 11/1983 | Vinciarelli | 363/21 |
| 4,674,019 | 6/1987 | Martinelli | 363/20 |
| 4,860,184 | 8/1989 | Tabisz et al. | 363/17 |
| 4,991,075 | 2/1991 | Saitou et al. | 363/15 |

Primary Examiner—Steven L. Stephan
Assistant Examiner—Bruce Dunn
Attorney, Agent, or Firm—Moonray Kojima

[57] ABSTRACT

A switching power supply for controlling an output voltage to a constant value with respect to fluctuations in input or in load, wherein are provided a DC power supply; two dividing capacitors connected in series to both ends of the DC power supply; two semiconductor switches connected in series to both ends of the DC power supply; a transformer having a primary winding, one end of which is connected to a connecting point of the two dividing capacitors; and a T type circuit comprising two inductors connected in series between the connecting point of the two semiconductor switches and the other end of the primary winding; and a capacitor connected between the connecting point of the two inductors and the other end of the primary winding. The control characteristics of the switching power supply are improved by reducing the dependency of the output voltage on fluctuations in the load.

9 Claims, 23 Drawing Sheets (1) Gate drive signal of MOSFET 3
(2) Gate drive signal of MOSFET 4
(3) Drain-source voltage of MOSFET 3
(4) Drain current of MOSFET 3
(5) Drain current of MOSFET 4
(6) Current flowing in the primary winding of transformer 12 and voltage resonant inductor 11
(7) Current flowing in dividing capacitors 1,2
(8) Current flowing in voltage resonant capacitors 9,10

Fig.10 (A) Period: $t_1 \leq t < t_2$
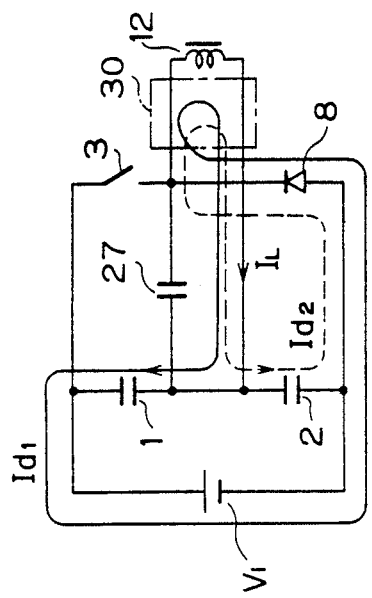
Fig.10 (B) Period: $t_2 \leq t < t_a$
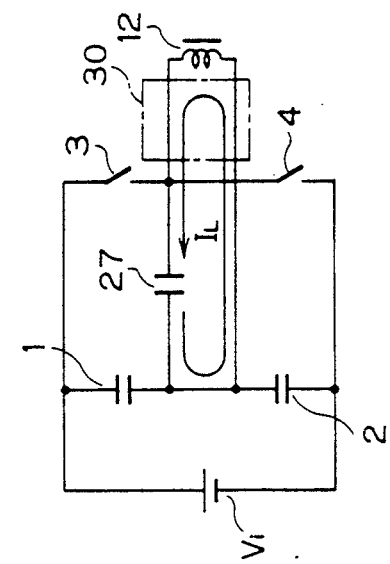
Fig.10 (C) Period: $t_a \leq t < t_4$
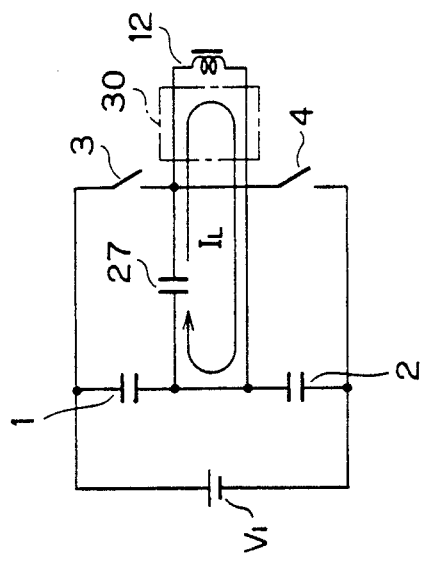
Fig.10 (D) Period: $t_4 \leq t < t_5$
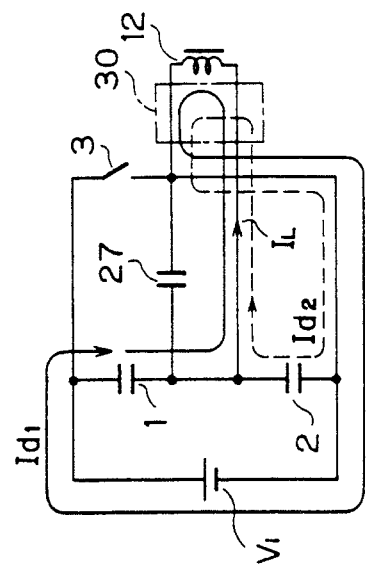

Fig.20
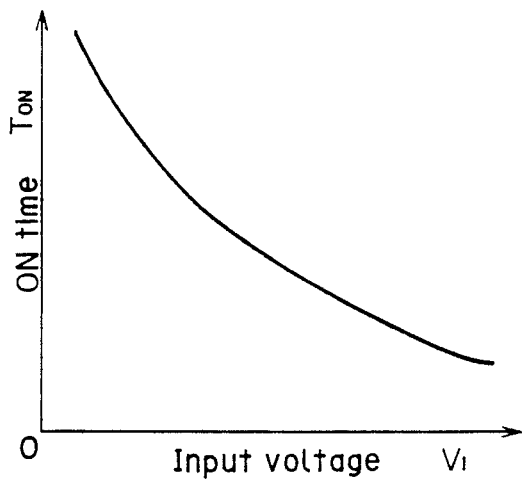
Fig.21
(1) In case of larger input voltage:
Output waveform (a) of control circuit 74
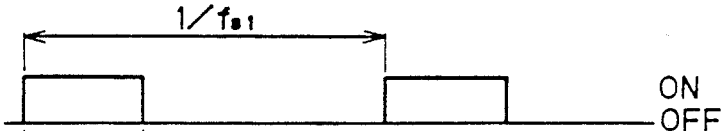
Output waveform (b) of control circuit 74
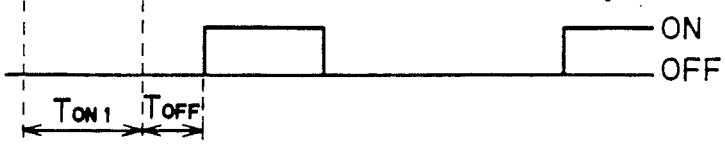
(2) In case of smaller input voltage:
Output waveform (a) of control circuit 74
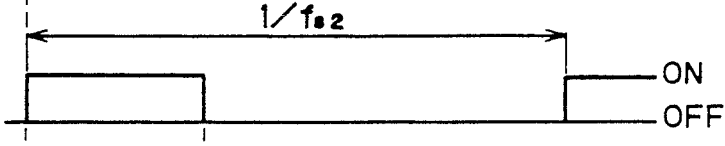
Output waveform (b) of control circuit 74
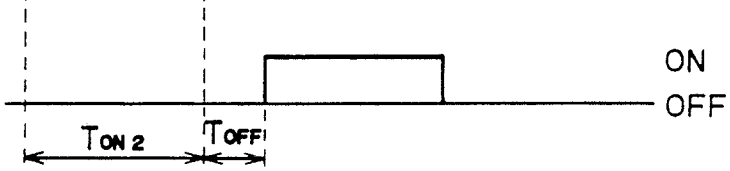

a1-a2: Control winding
b1-b2: Inductor winding
g11~g13: Air gap
l1~l8: Member of magnetic path $l_1 \sim l_8$: Member of magnetic path

SWITCHING POWER SUPPLY

BACKGROUND OF THE INVENTION

1. Field of Invention

This invention relates to switching power supplies; and more particularly, to such power supplies having improved control characteristics.

2. Description of Prior Art

The switching power supply, of the type to which the invention relates, serves to supply a constant DC voltage with respect to a variety of loads using an input DC voltage which fluctuates. In particular, a voltage resonant type switching power supply converts variations in voltages of semiconductor switches, such as MOSFETS, into sine waveforms which smoothly vary while utilizing an LC resonance. This type of supply is characterized by a smaller switching loss and less noise during switching operation than other types of prior art switching systems.

FIG. 1 is a circuit diagram depicting one example of a prior art switching power supply, wherein an input voltage Vi is applied to the system which comprises dividing capacitors 1,2, constituting a half-bridge circuit, for halving the input voltage Vi; semiconductor switches 3,4, such as MOSFETS, connected in series to both ends of the terminals to which are applied input voltage Vi; excitation power sources 5,6, connected between the gate/source terminals of the MOSFETS 3,4, for driving MOSFETS 3,4; parasitic diodes 7,8 to MOSFETS 3,4; voltage resonant capacitors 9,10 connected between the drain/source terminals of MOSFETS 3,4; a voltage resonant inductor 11, one end of which is connected to the connecting point between dividing capacitors 1,2; a transformer 12 having a primary winding, both ends of which are connected to the connecting point between MOSFETS 3,4, as well as to the other end of voltage resonant inductor 11; rectifying diodes 13,14 having anodes thereof connected to both ends of the secondary winding of transformer 12; snubber capacitors 15,16 connected in parallel to rectifying diodes 13,14; and a choke coil 17, one end of which is connected to the cathodes of rectifying diodes 13,14.

A filter capacitor 18 and a load resistor 19 are connected between the other end of choke coil 17 and the midpoint of the secondary winding of transformer 12. Choke coil 17 and filter capacitor 18 are combined to constitute an output filter. An output voltage Vo is impressed on both ends of load resistor 19. An output voltage Vh is produced by a half-bridge circuit comprising components of dividing capacitors 1,2 to voltage resonant capacitors 9,10. An output feedback circuit 20 comprises dividing resistors 21,22, reference voltage 23, comparator 24, and an ON time control circuit 25, and is used for changing the ON time of switching of MOSFETS 3,4, corresponding to the difference between the output voltage Vo and the reference voltage 23.

FIG. 2, comprising lines (1)-(8), is an operating waveform diagram used to explain the operation of the system of FIG. 1, wherein line(1) shows an output of excitation power source 5, i.e. a gate drive signal to a MOSFET 3 which is turned ON at a high level thereof; line (2) shows an output of excitation power source 6, vis., a gate drive signal to MOSFET 4 which is turned ON at a high level thereof; line (3) shows a drain source voltage of MOSFET 3; line (4) shows a drain current of MOSFET 3; line (5) shows a drain current of MOSFET 4; line (6) shows a current flowing in the primary winding of transformer 12 and voltage resonant inductor 11; line (7) shows a current flowing in dividing capacitors 1,2; and line (8) shows a current flowing in voltage resonant capacitors 9,10.

As shown in lines (1) and (2), MOSFETS 3,4 are turned ON alternately for a given period of time by excitation power sources 5,6. When MOSFET 3 is turned ON at a time t0, the current depicted in line (4) flows in MOSFET 3. A negative current flows in parasitic diode 7 and works to regenerate the energy to an input. When turning OFF MOSFET 3 at time t1, a resonant state is developed during a period ranging from t1 to t2 by use of voltage resonant capacitors 9,10 in combination with voltage resonant inductor 11.

A voltage at both ends of voltage resonant capacitor 10 is, although the period from t2 to t3 originally assumes the resonant gate, held at substantially zero for parasitic diode 8. To be specific, input voltage Vi is applied to both end of MOSFET 3, while both ends of MOSFET 4 assume substantially zero voltage. At this time, MOSFET 4 is turned ON (time t3) and a switching loss is thereby remarkably reduced (to zero voltage switching). MOSFET 4 is kept ON during the period from t3 to t4. When turning OFF MOSFET 4 (time t4), similar to the period t1-t2, the resonant state is developed once again, with the result that the voltage at both ends of MOSFET 4 rises while being resonated (period t4-t5).

During the period t5-t6, the zero voltage is held at both ends of voltage resonant capacitor 9 for the sake of parasitic diode as seen during the period t2-t3. Namely, input voltage Vi is applied to both ends of MOSFET 4, and both ends of MOSFET 3, assume substantially zero voltage. At this time, MOSFET 3 is turned ON (time t6), thereby considerably decreasing the switching loss (zero voltage switching). These operations are repeated.

The current depicted in line (6) flows in the primary winding of transformer 12 and in voltage resonant inductor 11, to transfer the energy to the secondary winding. Hence, when turning ON MOSFETS 3 and 4, the voltage applied thereto is almost zero. On the other hand, in an OFF state, the waveform of the voltage across the MOSFETS 3,4 is moderate due to the resonance.

For these two reasons, the switching loss is remarkably decreased and noise caused during switching operation is reduced.

Control over the output voltage is effected by means of the output feedback circuit 20 to change the ON time of switching of MOSFETS 3,4, corresponding to the difference between the output voltage and the reference voltage. More specifically, the ON time of MOSFETS 3,4 is changed by use of ON time control circuit 25 in accordance with the output error detected by dividing resistors 21,22 in combination with reference voltage 23 and comparator 24. That is to say, if the output voltage is small, the ON time is increased (both the switching cycle and the duty become large) and considerable input power is conveyed to the output side. On the other hand, if the output voltage is large, the ON time is decreased. Note that the OFF time is determined by the resonant frequency and is therefore invariable. As a result, the switching fequency has to be changed for output control.

According to the prior art switching power supply discussed above, if the output filter,consisting of choke coil 17 and filter capacitor 18, is sufficiently large, the secondary side can be replaced with a current source Io. If the half bridge circuit, consisting of the components ranging from dividing capacitors 1,2 to voltage resonant capacitors 9,10, is replaced with a DC-AC converter, the circuitry thereof can be expressed by the simpled circuit,shown in FIG. 3, comprising input voltage Vi, DC-AC converter 26, voltage resonant inductor 11, load resistor 19 and current source Io. However, the FIG. 3 arrangement is disadvantageous in that load resistor 19 and voltage resonant inductor 11 are connected in series which causes an increment in output impedance so that the output voltage Vo is adversely influenced by fluctuations in the load.

SUMMARY OF THE INVENTION.

Accordingly, an object of the invention is to overcome the aforementioned and other disadvantages and deficiencies of the prior art.

Another object is to improve control characteristics of a switching power supply by reducing the dependency of an output voltage on fluctuations in load. This object is attained in the invention by provision of a T type circuit comprising two inductors connected in series and a capacitor, one end of which connected to the connecting point of the two inductors.

A further object is to control the output voltage while the switching frequency remains fixed by providing a variable indcutor and an output voltage control circuit for increasing and decreasing the inductance of the variable inductor in correspondence to the difference between an output voltage and a reference voltage.

A still further object is to improve the transient characteristics of the output control by providing an arrangement wherein fluctuations in input are absorbed by an input feedforward loop or by providing an arrangement wherein the variation in width of the inductance required for output control is diminished by a switch control circuit controlling the ON time of switching of a semiconductor switch in accordance with input voltage.

Another object is to miniaturize the power supply by reducing the RMS value of the current flowing the dividing capacitor to divide the input voltage.

BRIEF DESCRIPTION OF THE DRAWINGS.

FIGS. 10(A)–10(D) are operating mode diagrams useful in explaining the state where a primary current is produced in the embodiment of FIG. 9.

FIG. 20 is a graph depicting the relationship between the input voltage of the embodiment of FIG. 19 and the ON time of switching.

FIG. 21 , comprising lines (1) and (2), is a waveform diagram depicting output waveforms of the embodiment of FIG. 19.

DETAILED DISCUSSION OF THE PREFERRED EMBODIMENTS

Figure 1:
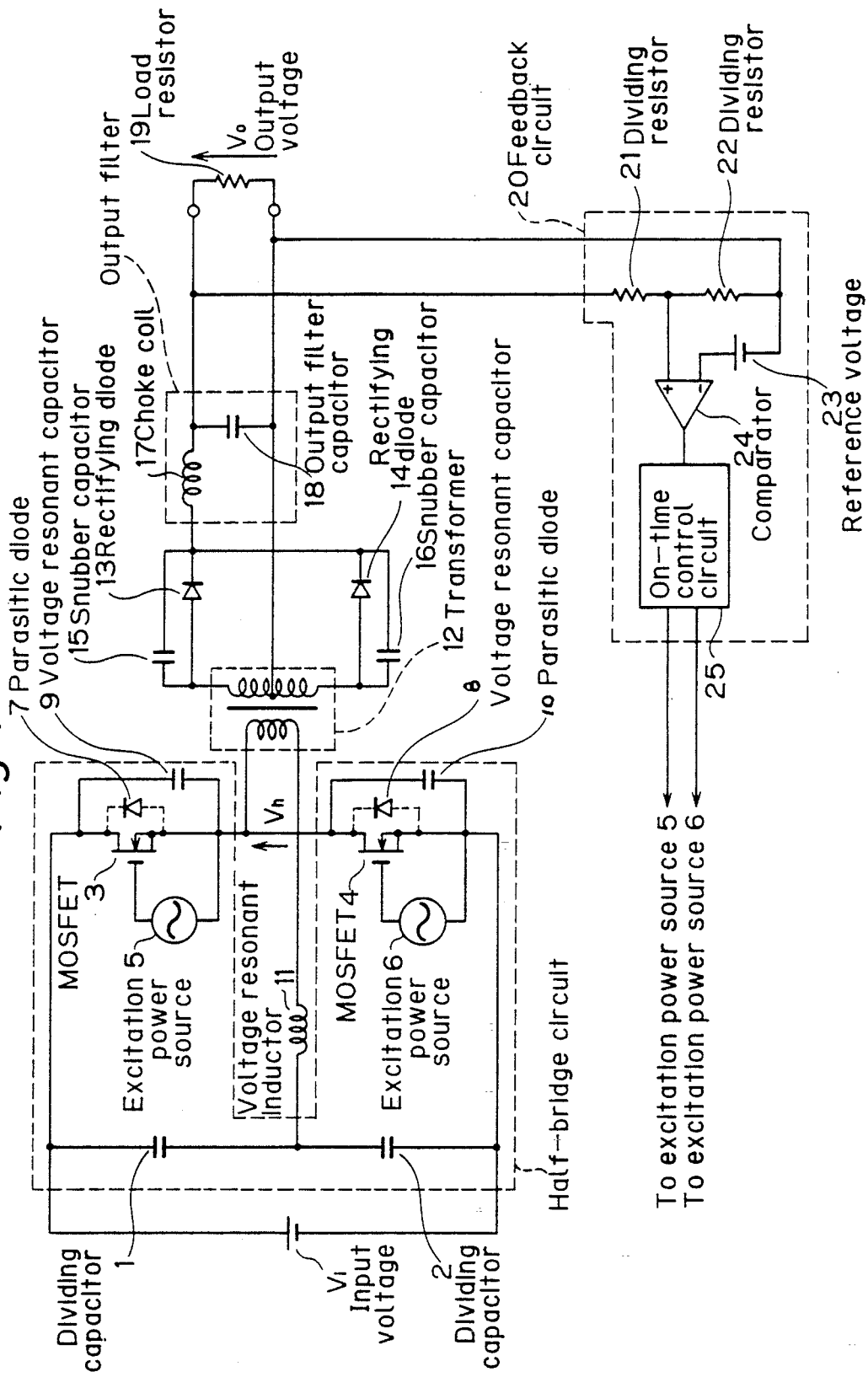
FIG. 1 is a circuit diagram depicting one example of a prior art switching power supply.
Figure 4:
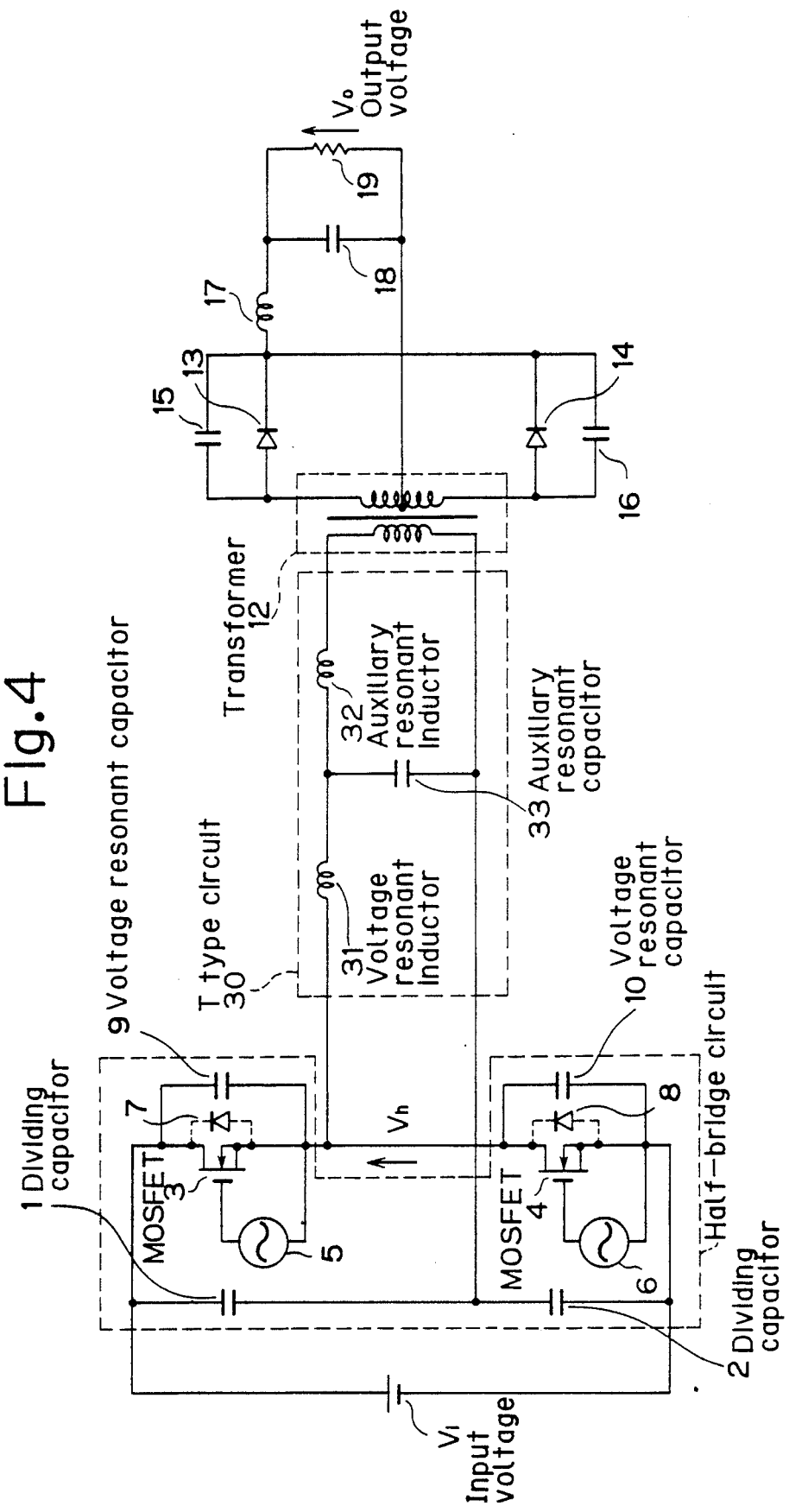
FIG. 4 is a circuit diagram depicting an illustrative first embodiment of the invention.

As depicted in FIG. 4, the embodiment of FIG. 4 differs from the arrangement of FIG. 1 in the provision in FIG. 4 of a T type circuit 30 comprising two resonant inductors (one being referred to as a voltage resonant inductor 31, and the other being referred to as an auxiliary resonant inductor 32) and auxiliary resonant capacitor 33, in place of voltage resonant inductor 11 of FIG. 1. The inductors 31,32 are connected in series between the connecting point of MOSFETS 3,4 and one end of the primary winding of transformer 12. The auxiliary resonant capacitor 33 has one end thereof connected to the connecting point of the two resonant inductors 31,32 and the other end thereof connected to the connecting point of the other end of the primary winding of transformer 12 and to the connecting point of dividing capacitors 1,2.

Figure 5:
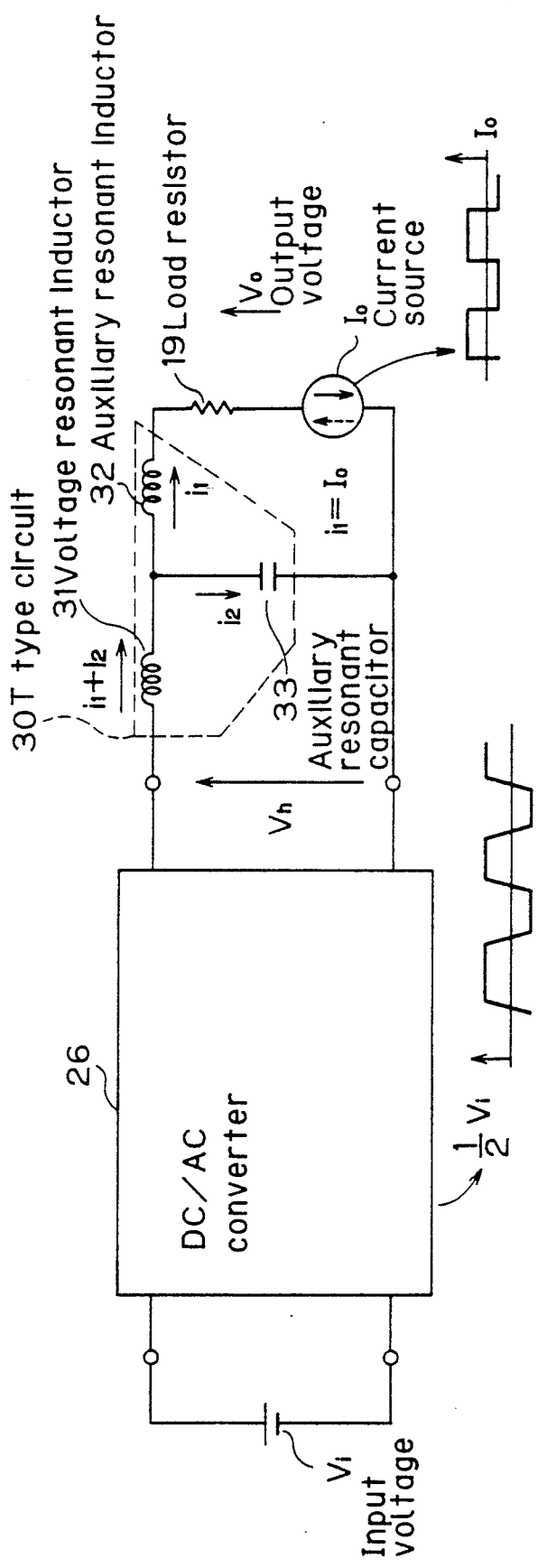
FIG. 5 is a simplified circuit diagram of the embodiment of FIG. 4.

If the output filter, comprising choke coil 17 and fiber capacitor 18, is sufficiently large, the secondary side can be replaced with a current source Io. Also, if the half-bridge circuit, comprising components ranging from dividing capacitors 1,2 to voltage resonant capacitors 9,10, is replaced with a DC-AC converter, the resulting circuitry hereof can be expressed as a simplified circuit diagram, such as shown in FIG. 5, wherein an input voltage Vi is applied to a DC-AC converter 26, which is connected to a T type circuit 30, a load resistor 19 and a current source Io, as depicted. A voltage Vh between the connecting point of the dividing capacitors 1,2 and the connecting point of MOSFETS 3,4 (i.e., in FIG. 5, the output voltage of the DC -AC converter 26) is expressed by a trapezoidal waveform where the peak value is given by the expression (input voltage Vi)/(2), as shown in FIG. 5. A current il, flowing in auxiliary resonant inductor 32, is expressed by a trapezoidal waveform where the peak value is a load current Io as indicated in FIG. 5. When approximating these waveforms with sine waves, the circuit equation representing the simplified circuit diagram of FIG. 5 is given as $$Vh = S \cdot Lr \ (i1 + i2) + i2/S \cdot Cs \qquad (1)$$

$$i2/S \cdot Cs = S \cdot Ls il + Vo \qquad (2)$$

wherein Lr is the inductance of voltage resonant inductor 31, Ls is the inductance of auxiliary resonant inductor 32, Cs is the capacitance of auxiliary resonant capacitor 32, and i2 is the current flowing in the auxiliary resonant capacitor 33.

Based on equations (1) and (2), when erasing current i2 flowing in auxiliary resonant capacitor 33, the following equation is set.

$$V0 = \{Lr + Ls(S^2 \cdot Lr \cdot Cs + 1)\} il \ / (1 + S^2 \cdot Lr \cdot Cs) \qquad (3)$$

From equation (3), the following equation (4) eliminates the dependency of output voltage Vo on load current il.

$$Lr + Ls(S^2 \cdot Lr \cdot Cs + 1) = 0 \qquad (4)$$

Namely, inductance Lr of voltage resonant inductor 31, inductance Ls of auxiliary resonant inductor 32, and capacitance Cs of auxiliary resonant capacitor 33 may be determined to satisfy the following equation (5) where the equation (4) has been solved and hence the output voltage Vo will not be adversely influenced by fluctuations in the load. This is referred to as an auxiliaary resonant condition.

$$\omega = 2\pi fs = \sqrt{(1 + Ls/Lr)(1/Cs \cdot Ls)} \qquad (5)$$

where fs is the switching frequency.

The output voltage at this time is given by $$Vo = -(Ls/Lr)(Vi/2) \qquad (6)$$

It follows that the output voltage Vo is determined only by output voltage Vh (which is Vi/2) of DC-AC converter 28, i.e. by input voltage Vi.

Figure 6:
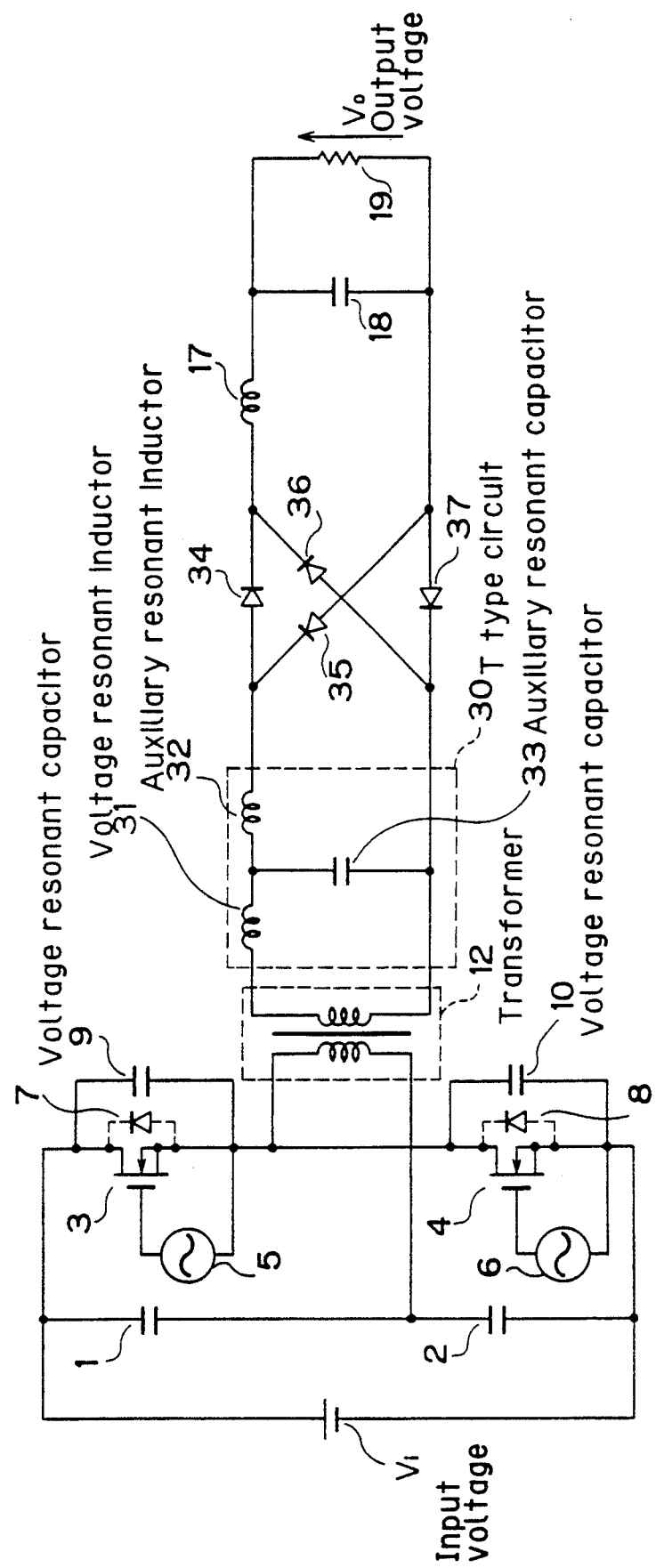
FIG. 6 is a circuit diagram depicting an illustrative second embodiment of the invention.

As depicted, FIG. 6 differs from FIG. 4 in that the T type circuit 30 comprising voltage resonant inductor 31, auxiliary resonant capacitor 33, and auxiliary resonant inductor 32, is provided in FIG. 6 on the secondary winding side of transformer 12, whereas in FIG. 4, the T type circuit 30 is on the primary winding side of trnasformer 12. Rectifying diodes 34,35,36,37 are provided as depicted.

The operation of the FIG. 6 embodiment is the same as that of the embodiment of FIG. 4. Thus, a description of the operation is omitted hereat . The condition ( a constant of the T type circuit 30) required to be fulfilled in order to eliminate influence due to the fluctuation in the load in the FIG. 6 embodiment, is that inductance Lr of voltage resonant inductor 31 be expressed as $Lr/N^2$, where N is the turns ratio of transformer 12; that inductance Ls of auxiliary resonant inductor 32 be expressed as $Ls/N^2$; and that capacitance Cs of auxiliary resonant capacitor 33 be expressed as $N^2Cs$ The equations setting the conditions for eliminating adverse influences due to fluctuations in the load, are similar to equations (4) and (5), wherein adverse influences due to fluctuations in the load on the output voltage are eliminated. Only the dependency associated with the fluctuations in the input still exists Hence, the control range of output voltage is narrowed substantially.

As depicted, the difference between the embodiment of FIG. 7(A) and the embodiment of FIG. 4 is that the arrangement in FIG. 7(A) a leakage inductance 32a on the primary winding side of transformer 12 is used in place of the auxiliary resonant inductor 32 of FIG. 4. The leakage inductance 32a is connected to one end of the primary winding of transformer 12.

The operation of the FIG. 7(A) embodiment is the same as that of the embodiment of FIG. 4. Thus, a description thereof is omitted hereat Similar to equations (4) and (5), the conditions (a constant of the T type circuit 30a) required for eliminating the adverse influence caused by fluctuations in the load, in the FIG. 7(A) embodiment is expressed in the following equations (7) and (8), wherein the inductance Ls of the auxiliary resonant inductor 32 is replaced with leakage inductance Le of transformer 12.

$$Lr + Le(S^2 \cdot Lr \cdot Cs + 1) = 0 \qquad (7)$$

$$\omega = 2\pi fs = \sqrt{(1 + Le/Lr)(1/Cs \cdot Le)} \qquad (8)$$

The output voltage Vo in this case is given by $$Vo = -(Le/Lr)Vi \qquad (9)$$

Hence, output voltage Vo is determined only by input voltage Vi. The output voltage is not,as in the case of the embodiment of FIG. 4, subjected to adverse influence by fluctuations in the load. Also, when the T type circuit utilizes the leakage inductance of the transformer, unlike the embodiment of FIG. 4, one of the two resonant inductors becomes unnecessary. This results in reduction in the number of components and improvement of reliability. The leakage inductance 32a may be located on the primary winding side of transformer 12, as shown in FIG. 7(A), or as shown in FIG. 7(B), leakage inductances 32a1 and 32a2 may be located on the secondary winding side of transformer 12. Where the secondary side leakage inductance is used, the leakage inductance Le of the equation condition for eliminating adverse influence due to fluctuations in the load, shown in equations (7) and (8), may be arranged to be a primary side conversion value.

The T type circuit 30 of FIG. 6 may be provided on the secondary winding side of transformer 12, and a leakage inductance of transformer 12 may be substituted for the voltage resonant inductor 31 connected to one end of the secondary winding of transformer 12. In that case, the same effects as those of the embodiment of FIG. 7(A) are obtained.

Figure 7:
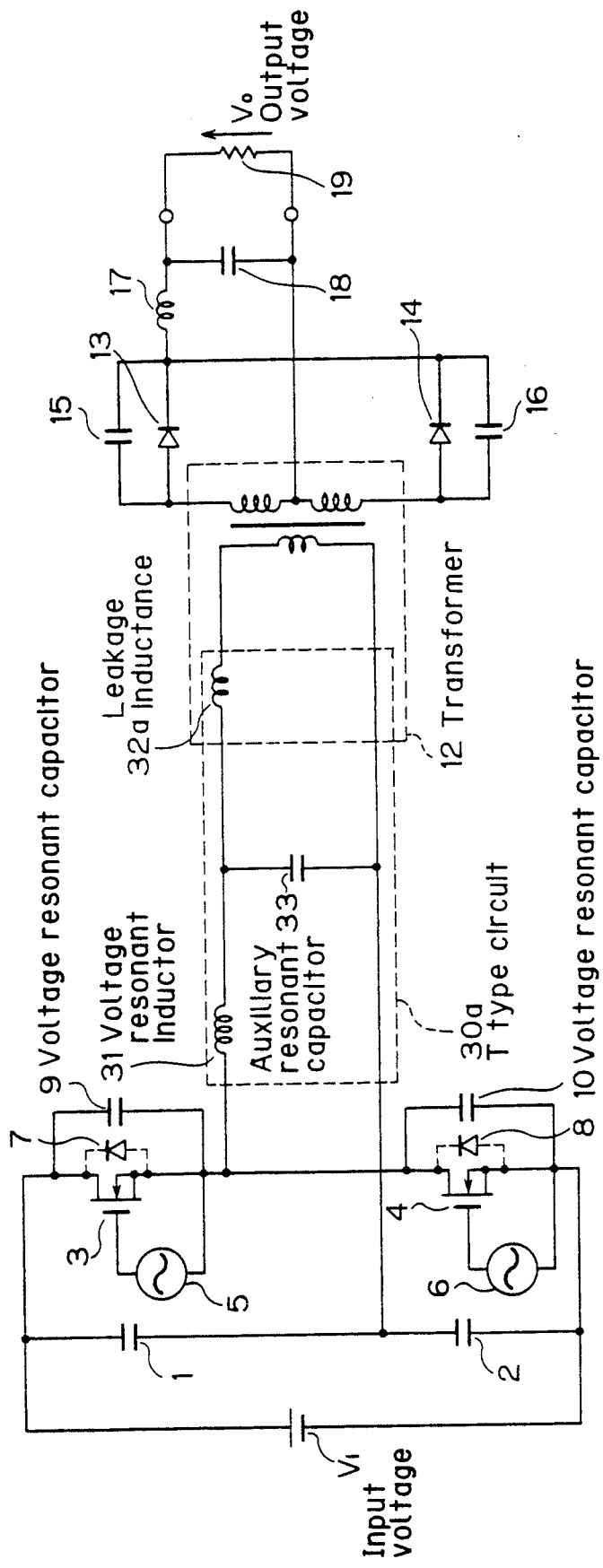
FIG. 7(A) and 7(B) are circuit diagrams depicting an illustrative third embodiment of the invention.
Figure 7:
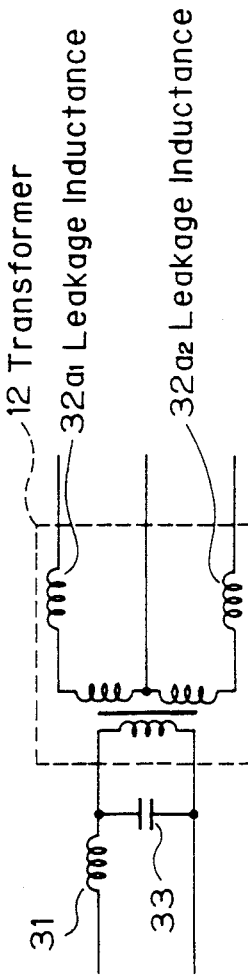
Figure 8:
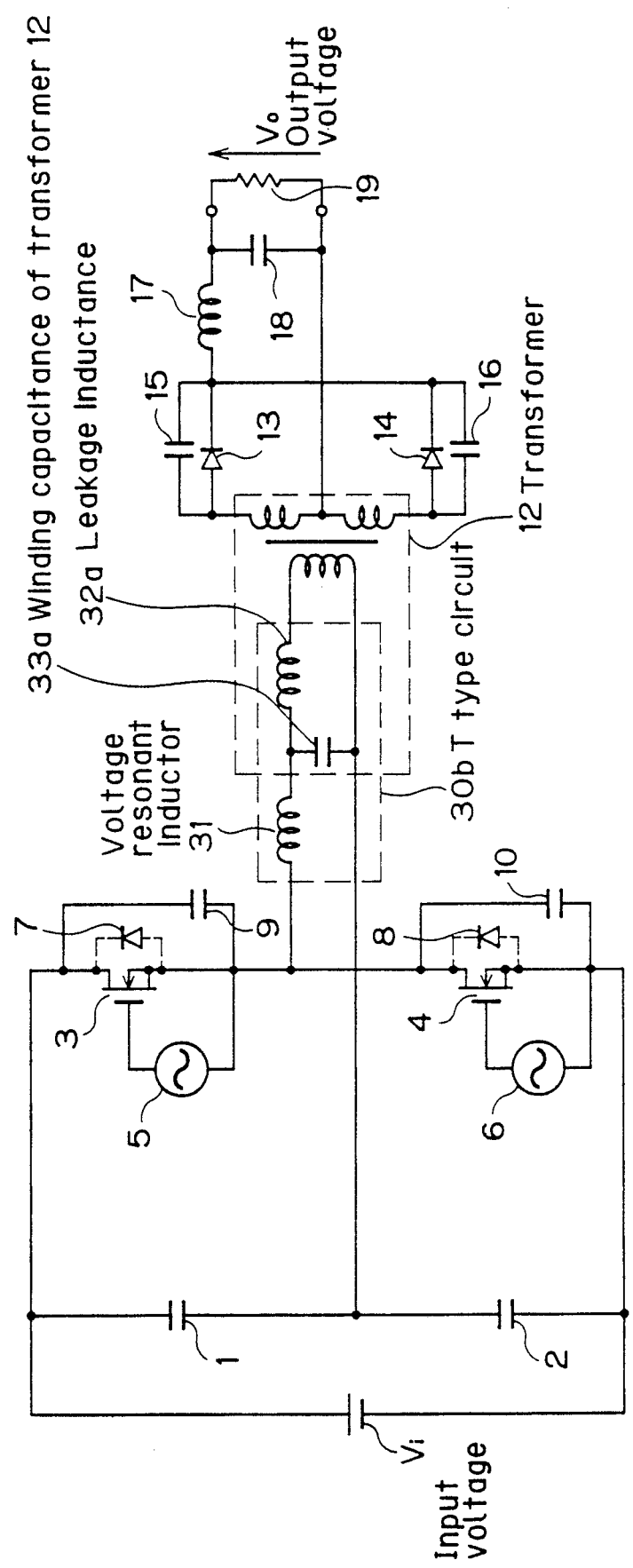
FIG. 8 is a circuit diagram depicting an illustrative fourth embodiment of the invention.

As depicted, the difference between the embodiment of FIG. 8 and the embodiment of FIG. 7(A) is that in FIG. 8 a winding capacitor 33a of the primary winding of transformer 12 is substituted for auxiliary resonant capacitor 33 of FIG. 7(A). The operation of the FIG. 8 embodiment is similar to the embodiment of FIG. 4. Hence description hereof is omitted hereat. The condition required to eliminate adverse influence by fluctuations in load are as shown in equations (7) and (8), and for this FIG. 8 embodiment, is expressed by replacing capacitance Cs of auxiliary resonant capacitor 33 with the winding capacitor Cw of the primary winding of transformer 12, that is $$Lr + Le(S^2 \cdot Lr \cdot Cw + 1) = 0 \quad (10)$$

$$\omega = \sqrt{(1 + Le/Lr)(1/Cw \cdot le)} \quad (11)$$

If the T type circuit utilizes the winding capacitance of the transformer 12, the necessity in the FIG. 8 embodiment, for the use of the auxiliary resonant capacitor is removed, unlike the device of FIG. 7(A). Thus, in the FIG. 8 embodiment, the number of components is further reduced and reliability is further increased.

If the T type circuit 30 shown in FIG. 6 is provided on the secondary winding side of transformer 12, the leakage inductance of transformer 12 may be substituted for the voltage resonant inductor 31. The winding capacitance of the secondary winding of transformer 12 may also be substituted for auxiliary resonant capacitor 33. With this arrangement, the same effects as those of the embodiment of FIG. 8 are obtained.

Figure 2:
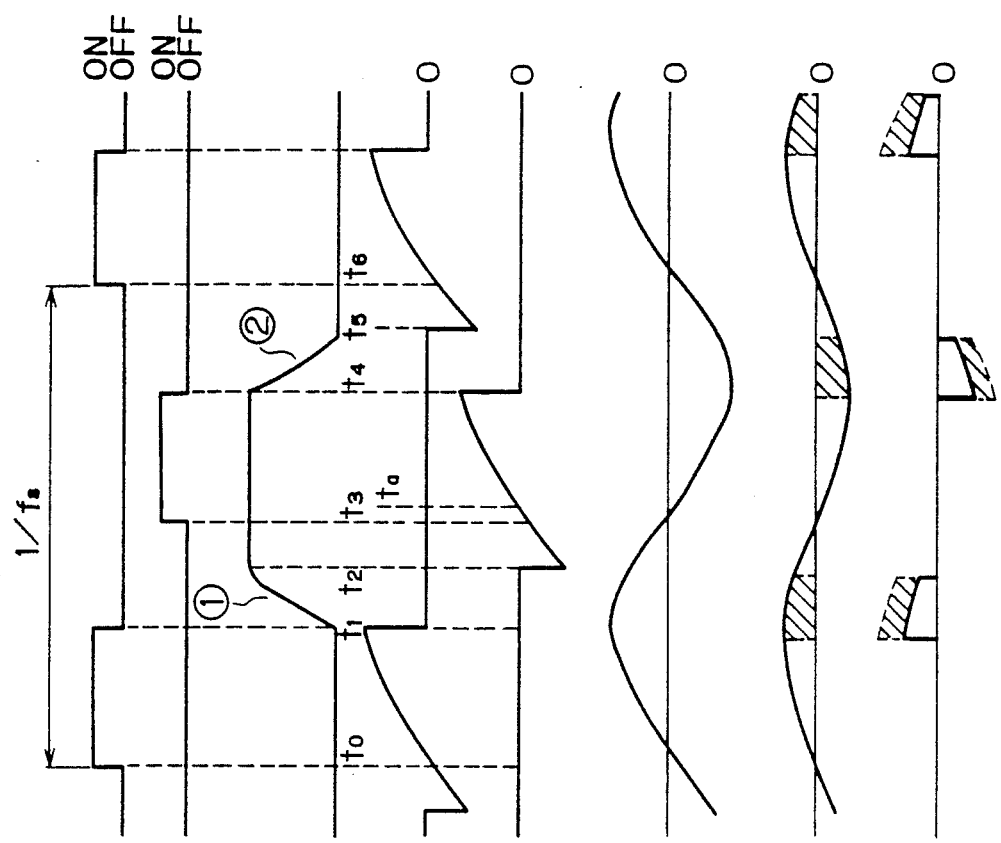
FIG. 2, comprising lines (1)–(8), is an operating waveform diagram used to explain the oepration of the device of FIG. 1.
Figure 3:
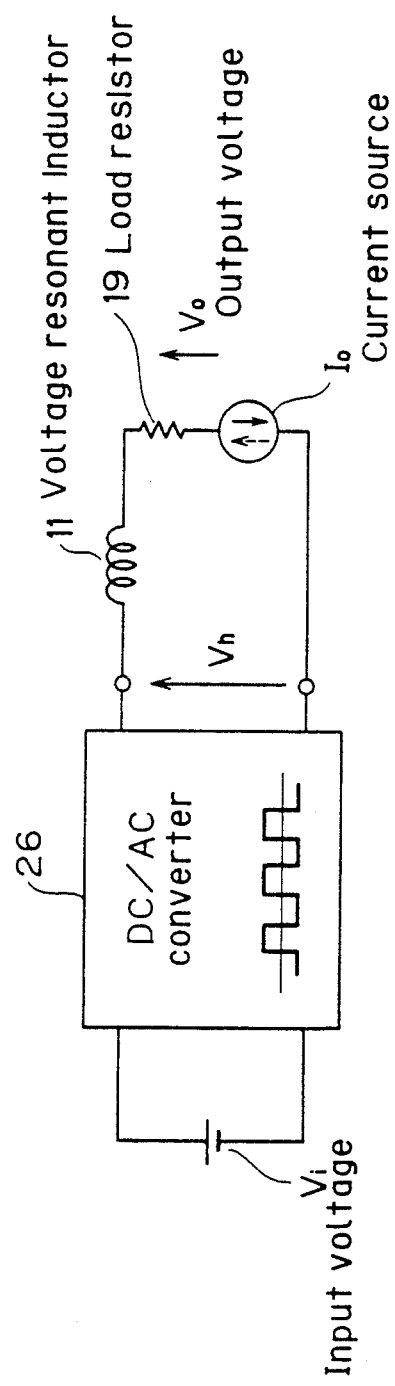
FIG. 3 is a simplified circuit diagram of the device of FIG. 1.

In the prior art example of FIG. 1, the voltage resonant capacitors 9,10 are connected to both ends of MOSFETS 3,4. The current as shown in FIG. 2, line (7), flows constantly in the dividing capacitors 1,2 used for dividing the input voltage Vi, thereby augmenting the effective current flowing in. . dividing capacitors 1,2. Thus, large sized capacitors, each having an allowable ripple current, must be used as dividing capacitors 1,2 to restrain generating of heat. This hinders miniaturization of the power supply.

Figure 9:
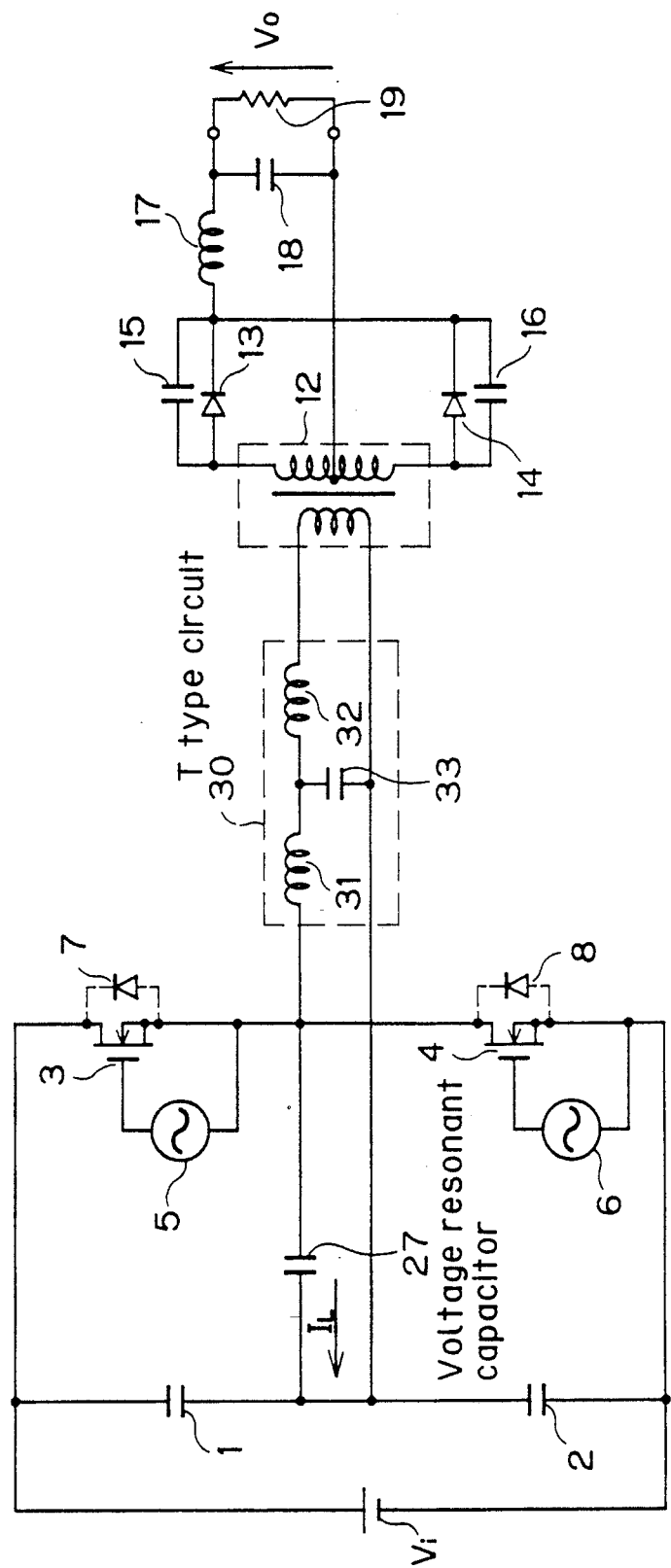
FIG. 9 is a circuit diagram depicting an illustrative fifth embodiment of the invention.

The FIG. 9 embodiment, on the other hand, facilitates the miniaturization of power supplies by reducing the RMS current of the dividing capacitors used for dividing the input voltage.

As depicted, the difference between the embodiments of FIG. 9 and FIG. 4 is that in FIG. 4, the voltage resonant capacitors are connected to both ends of MOSFETs 3,4, whereas in FIG. 9, a voltage resonant capacitor 27 is connected between the connecting point of the dividing capacitors 1,2 and the connecting point of MOSFETS 3,4.

The operation of the FIG. 9 embodiment is similar to that of the FIG. 4 embodiment, except that the generation of current on the primary side differs during a certain period, i.e. there appears a period for which no current flows in the dividing capacitors 1,2. Hence, a description of the operation can be simplified for sake of convenience.

Turning to FIGS. 10(A)–10(D), which depict an operating mode diagram of the state where the current on the primary side of the FIG. 9 embodiment is generated by splitting into four operating modes during time periods t1–t5, shown in the waveform diagram of FIG. 2, lines (1)–(8). As shown in FIG. 10(A), both MOSFETS 3,4 of FIG. 9, are turned OFF during the period from It to t2, and a resonant state is present due to the closed loop formed of voltage resonant capacitor 27 and T type circuit 30. During this period, no current flows in dividing capacitors 1,2. During the period from t2 to ta, shown in FIG. 19(B), the parasitic diode 8 is turned ON, while the voltage at both en of voltage resonant capacitor 27 is kept at a constant level obtained by dividing the input voltage Vi with the dividing capacitors 1,2. The current flowing through T type circuit 30 is transmitted as currents Id1 and Id2 through dividing capacitors 1,2.

During the period from ta to t4, shown in FIG. 10(C) MOSFET 4 is turned ON, and opposite to the period of FIG. 10(B), the currents Id1 and Id2 flowing in dividing capacitors 1,2 in turn flow into T type circuit 30. During the period from t4 to t5, as shown in FIG. 10(D), MOSFETS 3,4 are again turned OFF, and the same resonant state as that for the period seen in FIG. 10(A) is present. No current flows in the dividing capacitors 1,2. Thus, the current flowing through dividing capacitors 1,2 assumes an discontinuous waveform where a portion indicated by the oblique lines in FIG. 2, line (7) is removed. The current, taking the discontinuous waveform and flowing in the voltage resonant capacitor 27, has a waveform which is twice the size of the waveform which includes the portion drawn with oblique lines in FIG. 2, line (8), because of the presence of only a single voltage resonant capacitor. Hence, the RMS value of current flowing in the dividing capacitors 1, 2 is reduced by a quantity equivalent to the portion including the oblique lines in FIG. 2, line (7). Thus, the amount of heat produced by dividing capacitors 1,2, is decreased. A small sized capacitor having a small allowable ripple current can thus be used, and hence miniaturization of the arrangement is further enhanced.

The FIG. 9 embodiment may be used with the T type circuit of FIG. 6 provided on the secondary winding side of transformer 12, and further with the leakage inductances of FIGS. 7,8, and the winding capacitance of the transformer 12. Even in such cases, the same advantageous effects are obtained.

Figure 11:
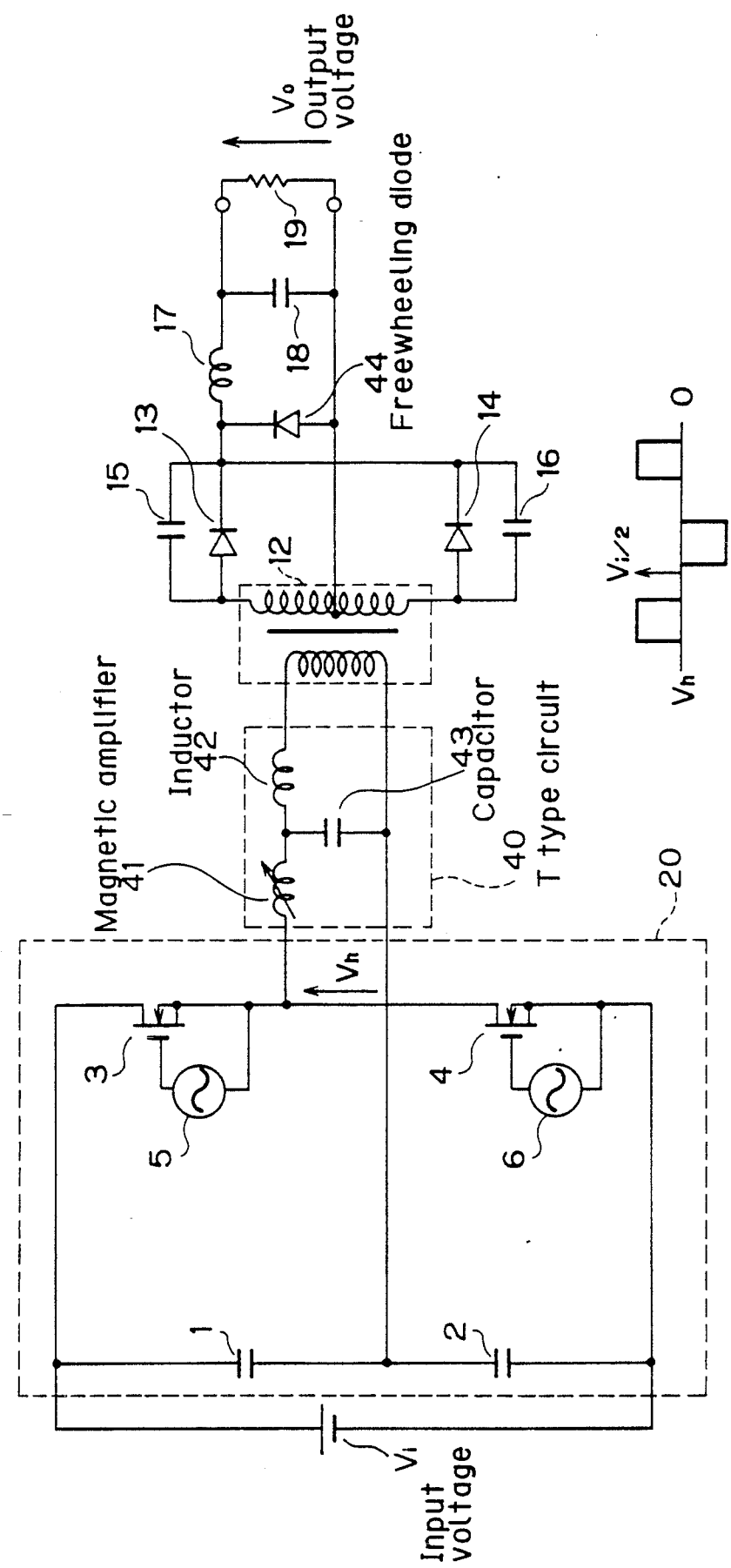
FIG. 11 is a circuit diagram depicting an embodiment using the invention in a current control type magnetic amplifier constant voltage power supply.

The embodiment of FIG. 11 is a current control type magnetic amplifier constant voltage power supply which differs from the prior art in the addition of an inductor 42 and a capacitor 43. A rectifying diode 44 is provided. A current control type magnetic amplifier 41 is used to control the output and may be considered as a kind of variable inductor which is capable of controlling the output by varying the inductance in accordance with fluctuations in the input or in the load. The FIG. 11 embodiment is similar to that of the voltage resonant switching power supply of FIG. 4. However, the power supply of FIG. 11 is not classified as a resonant type.

The MOSFETS 3,4 are alternately turned ON at a constant frequency, and an output waveform Vh of the half-bridge circuit 20 takes a pulse form, as depicted. With this arrangement as with the embodiment of FIG. 4, the dependency of the output voltage on the load substantially disappears. Thus, the output control is effected with respect to the fluctuations in input. A small inductance variable range is sufficient to control the current control type magnetic amplifier 41. Thus, design and implementation of such an arrangmeent is simplified.

The embodiment of FIG. 11 may be arranged so that the leakage inductance of transformer 12 is substituted for inductor 42, and the winding capacitance of transmformer 12 may be substituted for the capacitor 43.

Figure 12:
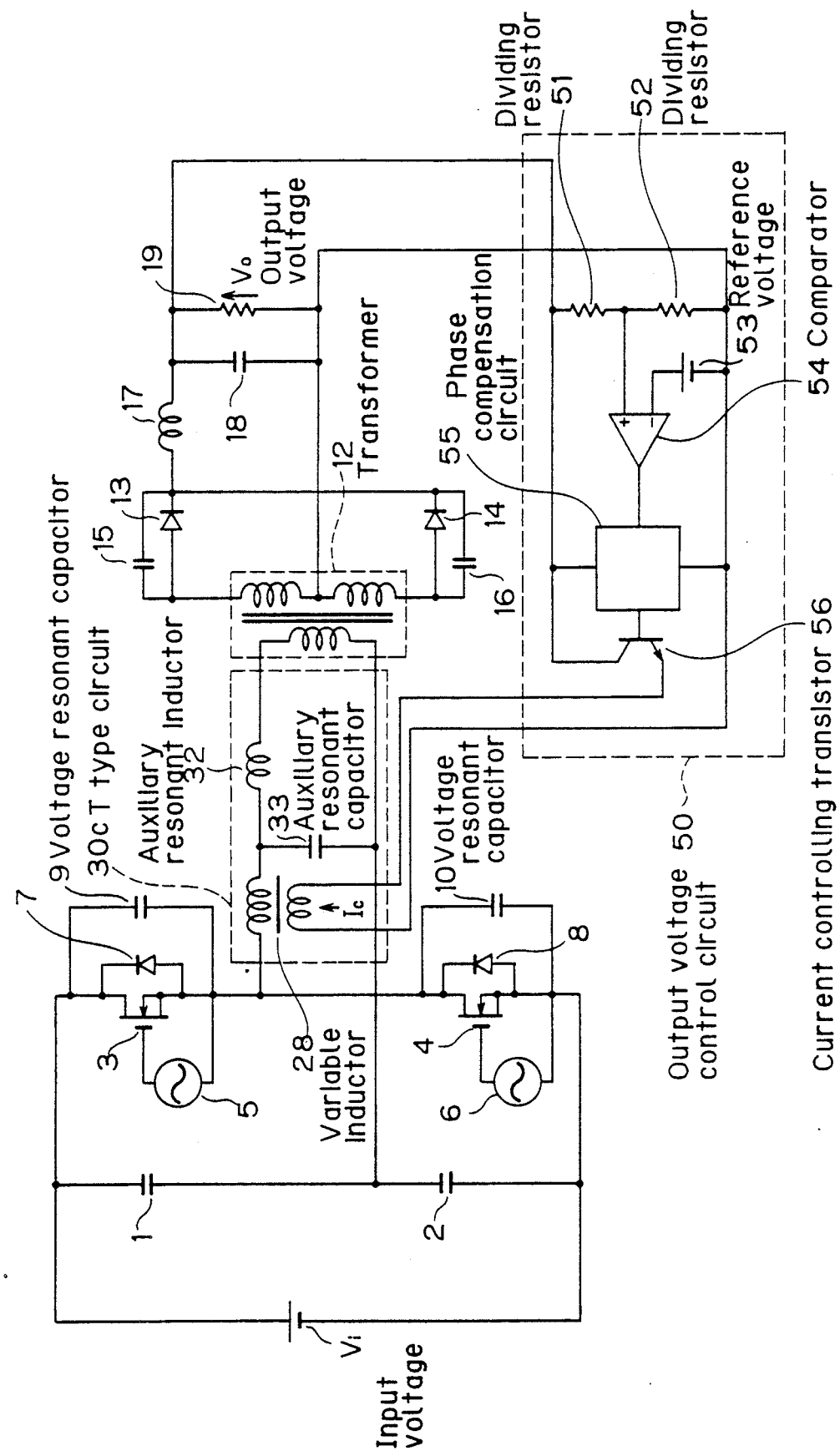
FIG. 12 is a circuit diagram depicting an illustrative sixth embodiment of the invention.

FIG. 12 depicts a switching power source classified as a voltage resonant type. In the FIG. 1 apparatus, the resonant element is a fixed inductor or a fixed capacitor, to keep the resonant frequency constant, and the switching frequency is varied to control the output voltage. The switching frequency does, however, fluctuate depending on the fluctuations in the load, or in the input. Thus, the output filter must be designed to set the frequency at a minimum. This leads to difficulty in miniaturizing the device. Also, the switching frequency varies over a wide range. Thus, the noise filter must cover a wide range which requires a large sized filter. The embodiment of FIG. 12 addresses these problems, and aims to control the output voltage while keeping the switching frequency fixed, ,so that the components which are used facilitate miniaturization of the arrangement.

As depicted, the difference between the embodiments of FIGS. 12 and 4 are as follows. One of the two resonant inductors comprising the T type circuit is used as a variable inductor 28 so that the control current Ic is increased or decreased by use of output voltage control circuit 50 in accordance witht the difference between the output voltage Vo and the reference voltage. The inductance of variable inductor 28 is varied by control current Ic to control the output voltage Vo to be a constant value. Output voltage control circuit 50 comprises dividing resistors 51,52; reference voltage 53; comparator 54 for effecting amplification by taking the difference between the output voltage as divided by dividing resistors 51,52 and the reference voltage 53; phase compensation circuit 55 for performing phase compensation on the output of comparator 54; and a current controlling transistor 56 for effecting current amplification on the output of the phase compensation circuit 55 and for driving a control winding of the variable inductor 28. The phase compensation circuit 55 has a power source driven by the voltage at both ends of load resistor 19.

The operation of the FIG. 12 embodiment is as follows. The voltage at both ends of load resistor 19 is split by dividing resistors 51,52. Comparator 54 functions to take the difference between the divided output voltage and the reference voltage 53 and , after amplification, carry out phase compensation on the output thereof. Thereafter, current conversion is carried out by current controlling transistor 56 to change control current Ic.of variable inductor 28. If the output volage Vo is large, output control circuit 50 operates to reduce control current Ic. On the other hand, if the output voltage Vo is small, control circuit 50 operates to increase control current Ic. The inductance of variable inductor 28 is thereby varied, and output voltage Vo is thus controlled.

When T type circuit 30 is in a resonant condition, the load dependency of the output voltage is remarkably reduced, and the output voltage Vo is approximately expressed by the following $$|Vo| = (Ls/Lr)Vi \qquad (12)$$

wherein Ls is the inductance of auxiliary resonant inductor 32, and Lr is the inductance of variable inductor 28.

Thus, the output voltage can be readily controlled while keeping constant the switching frequency, by changing inductance Ls of auxiliary resonant inductor 32 or inductance Lr of variable inductor 28.

The resonant frequency varies with changes in inductance, whereby the inclinations shown as (1) and (2) in line(3)of FIG. 2 vary. The variations in these inclinations do not exert any influence on output voltage Vo if the condition for effecting zero voltage switching is satisfied.

The leakage inductance of transformer 12 may be substituted for auxiliary resonant inductor 32 of T type circuit 30C in the embodiment of FIG. 12. Also, the winding capacitance of transformer 12 may be substituted for the auxiliary resonant capacitor 33. Advantageously, such an arrangement has a reduced number of components as compared with the embodiment of FIG. 12 and has added improved reliability.

Figure 13:
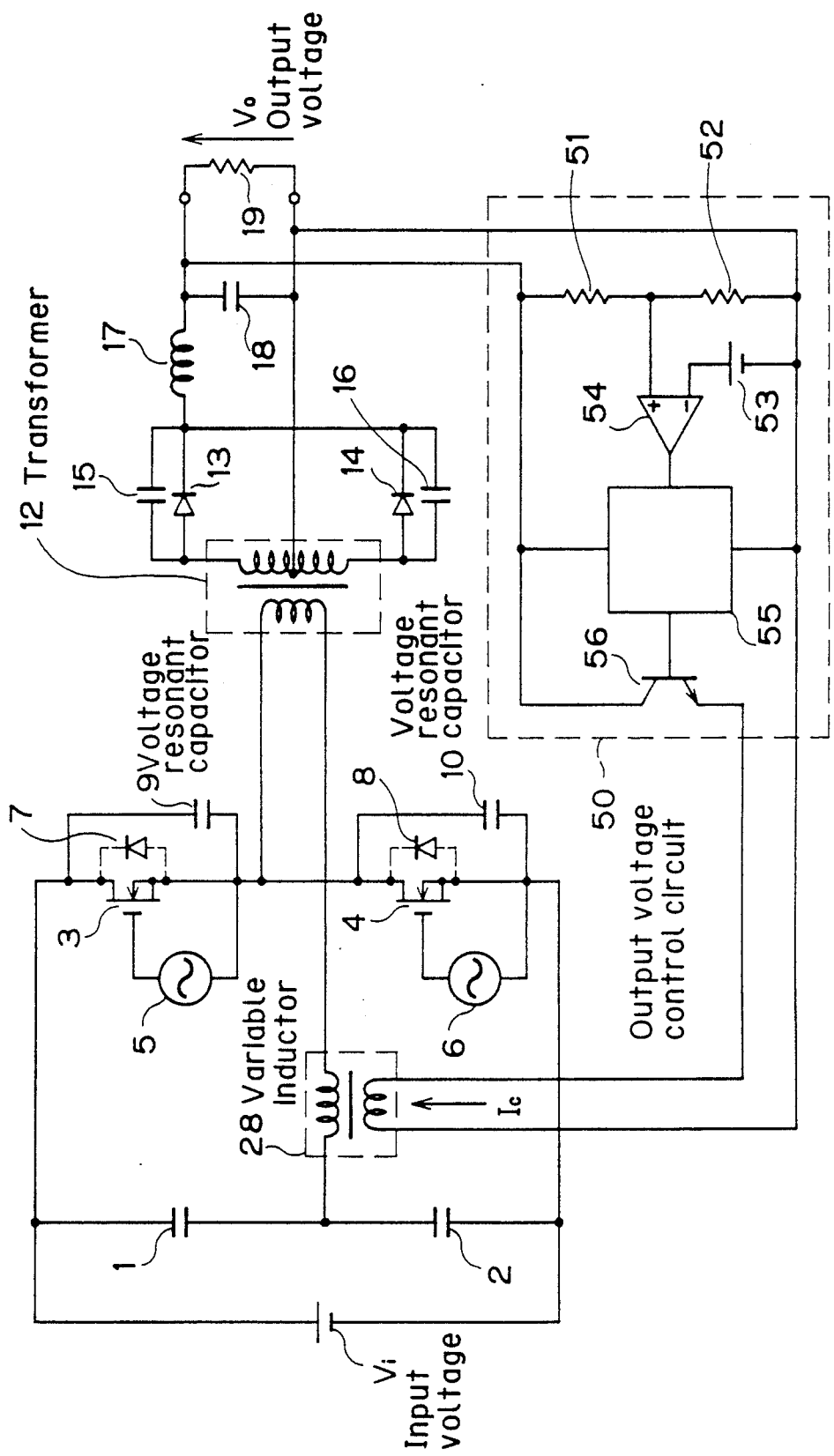
FIG. 13 is a circuit diagram depicting a variation of the embodiemnt of FIG. 12.

FIG. 13 depicts a variant of the embodiment of FIG. 12 wherein no T type circuit is used. However, variable inductor 28 is used instead of voltage resonant inductor 11 of FIG. 1. Also, output voltage control circuit 50 is provided for increasing or decreasing control current Ic of variable inductor 28 according to the difference between output voltage Vo and the reference voltage. The inductance of variable inductance 28 is changed by control current Ic to control output voltage Vo to be a constant value. Output voltage Vo is approximately expressed by the following.

$$Vo = Vi/(2N\sqrt{1 + (L/R)^2} \qquad (13)$$

wherein N is the ratio of number of turns of the primary winding to the number of turns of the secondary winding of transformer 12, R is the load resistance, and L is the inductance of variable inductor 28.

Hence, if inductance L is set to be small, output voltage Vo increases. On the other hand,if inductance L is set to be large, output voltage Vo decreases. The control range of the output voltage becomes slightly larger than in the embodiment of FIG. 12, by changing inductance L of variable inductor 28. It is also feasible to control output voltage Vo while keeping constant the switching frequency.

Figure 14:
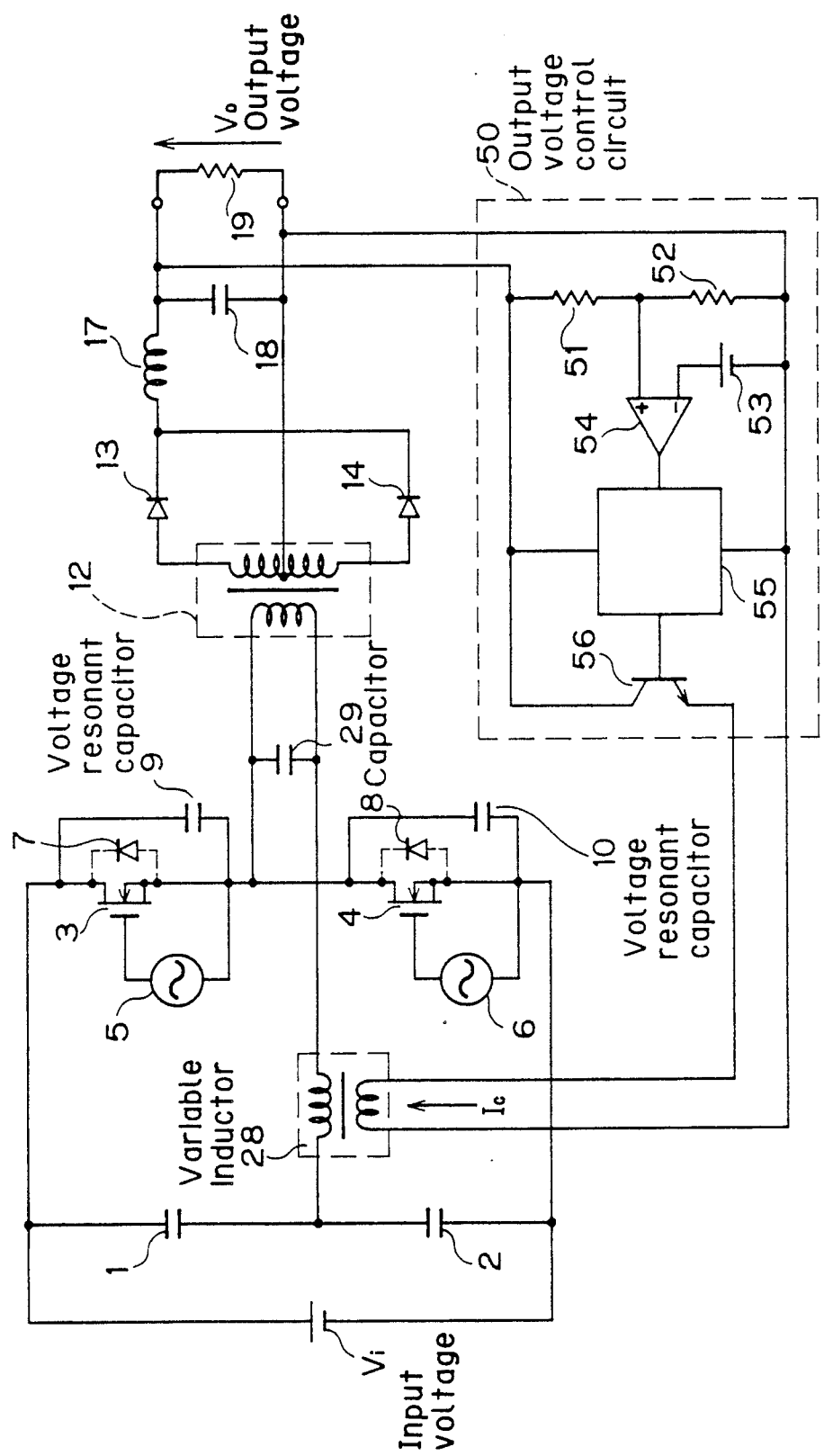
FIG. 14 is a circuit diagram depicting a variation of the embodiment of FIG. 13.

FIG. 14 is a variant of FIG. 13 and a capacitor 29 is connected to both ends of the primary winding of transformer 12 instead of to snubber capacitors 15,16 of FIG. 13. Output voltage Vo can, similar to FIG. 13, be controlled while keeping constant the switching frequency. At the same time, the current flowing via capacitor 29 does not go through the winding of transformer 12. Thus, the designing of transformer 12 is simplified as contrasted to the FIG. 13 arrangement.

Figure 15:
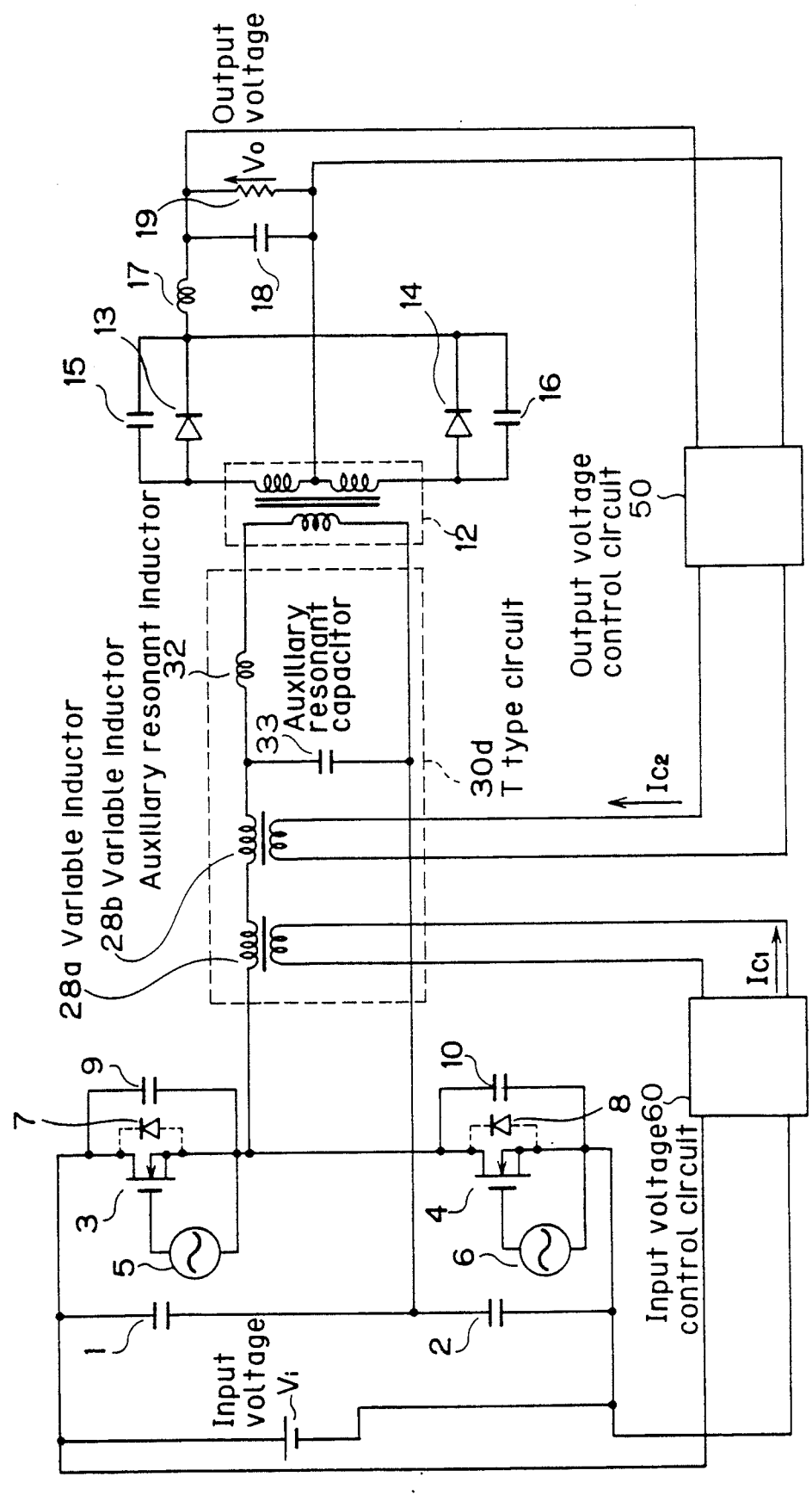
FIG. 15 is a circuit diagram depicting an illustrative seventh embodiment of the invention.

As depicted, the difference between the embodiments of FIG. 15 and 12 is that in FIG. 15, there are provided two variable inductors 28a,28b in the T type circuit 30d. One variable inductor 28a is formed with a feedforward loop from the input voltage. The other variable inductor 28b is formed with a feedback loop from the output voltage. In the embodiment of FIG. 12, the T type circuit contributes to a considerable shrinkage in the variation range of the variable inductor with respect to fluctuations in the load. In connection with fluctuations in the input, however, it is required that the variable inductor be changed substantially in proportion thereto. The variation range thereof is relatively large. The number of turns of the control winding is therefore increased, whereby the inductance of the control winding is augmented. As a result, the transition of the control current is restricted by this inductance, and a transient response is deteriorated as the case may be. The FIG. 15 embodiment aims to overcome this difficulty. The output control characteristics are further improved by changing the inductance from the input voltage to the feedforward.

Figure 16:
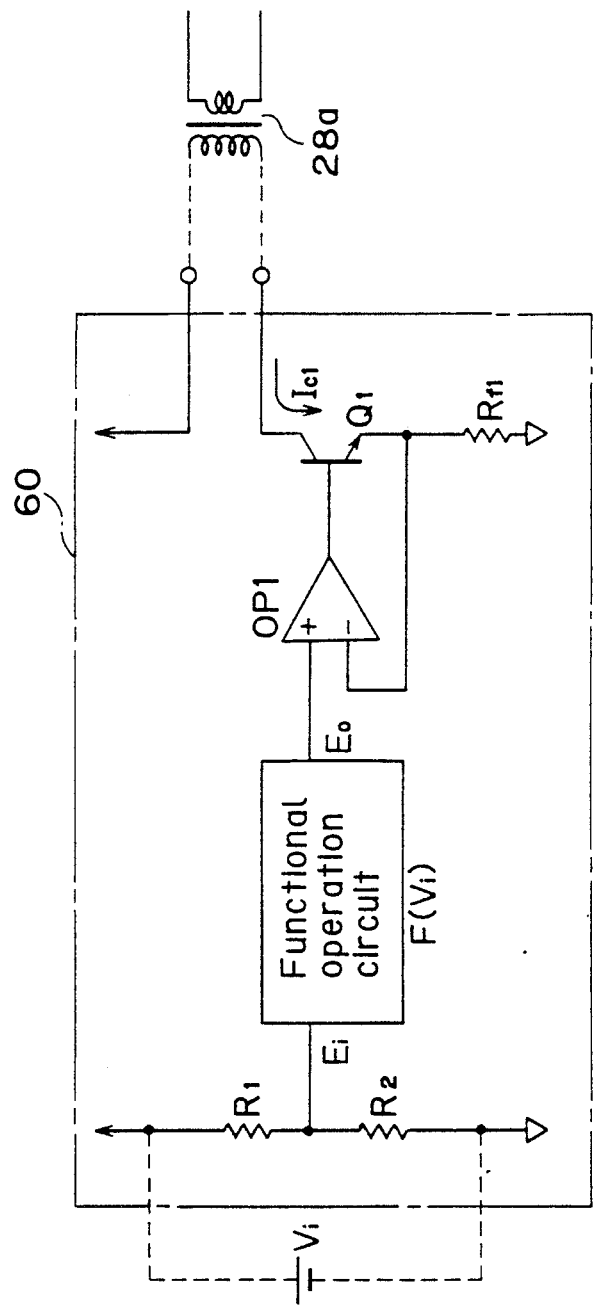
FIG. 16 is a circuit diagram depicting an example of an input control circuit used in the embodimetn of FIG. 15.

Returning to FIG. 15, an input voltage control circuit 60 applies to control winding of variable inductor 28a, a control current Ic1 corresponding to variations in input voltage Vi. Circuit 60, as shown in FIG. 16, operates to perform a functional operation on a divided output voltage Ei obtained by dividing input voltage Vi by use of dividing resistors r1 and R2. An output Eo of the circuit undergoes current amplification by use of a circuit consisting of an OP-amp Op1, a transistor Q1 and a resistor Rf1, thus providing control current Ic1 for driving the control winding of variable inductor 28a.

Figure 17:
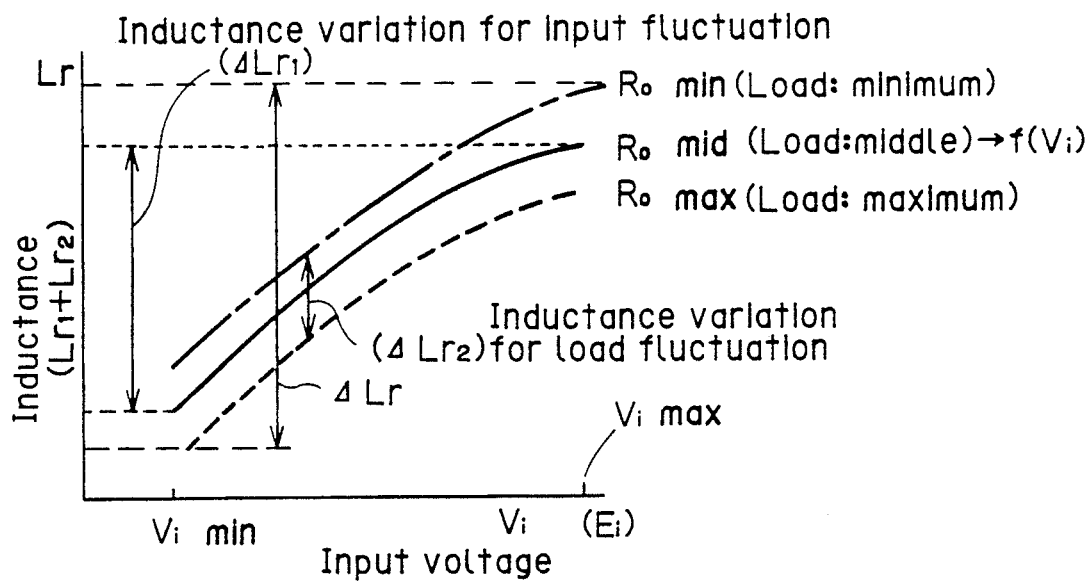
FIG. 17 is a graph depicting the relationship between variable inductor control range and fluctuations in both the input and the load.
Figure 18:
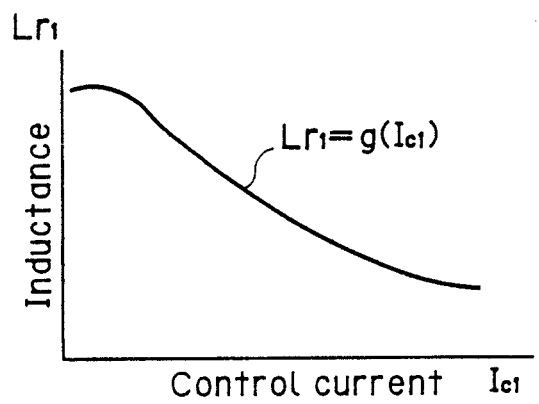
FIG. 18 is a graph depicting characteristics of a variable inductor.

The operational steps of the embodiment of FIG. 15 which are different from the FIG. 12 embodiment are as follows. Concerning the control range of the variable inductor necessary for output control, as shown in FIG. 17, a control range of $\Delta Lr$ is needed for covering fluctuations in both the load and the input. A broader control range is required for input fluctuations ($\Delta Lr1$) rather than load fluctuations ($\Delta Lr2$). Let f(vi) be the relationship between input voltage vi in a central value (Ro-mid is the solid line in FIG. 17) within a load range and the inductance Lr of the two variable inductors 28a,28b; and let g(Ic1) be the relationship between the inductance Lr1 of variable inductor 28a shown in FIG. 18 and the control current Ic1. Then, $$Lr1 = g(Ic1) = g(F(Vi)) \quad (14)$$
$$= f(vi)$$

When setting a functional operation F(Vi) in input control voltage circuit 60 so as to establish equation (14), the control range of variable inductor 28a becomes ($\Delta Lr1$).

On the other hand, the input fluctuations are slower than the load fluctuations in the switching power supply, and a quantity equivalent to the input fluctuations is controlled by variable inductor 28a. Variable inductor 28b may herefore control a quantity equivalent to the load fluctuations, and the control range thereof becomes ($\Delta Lr2$) shown in FIG. 17. As a matter of fact, when input voltage Vi varies, the auxiliary resonant condition deviates, so that the control range ($\Delta Lr2$) becomes more or less different depending on input voltage Vi. However, the following relationship is set.

$$(\Delta Lr2max) < <(\Delta Lr)$$

Hence, the variation range of variable inductor 28b is remarkably diminished, and the inductance of the control winding of variable inductor 28b is thereby reduced. Consequently, the transient response is improved.

In addition, a small amount of control winding current is sufficient, which in turn contributes to a reduction in control electric power needed for the output feedback. The control ranges ($\Delta Lr1$ and $\Delta Lr2$) are covered by the single variable inductor used in the embodiment of FIG. 12. The number of turns of the control winding increases and the response deteriorates. On the other hand,the inductance of variable inductor 28a is augmented, but, variable inductor 28a does not require a response as fast as the variable inductor 28b, which causes no problem. The number of turns of the control winding can be incremented,whereas the control power decreases. Consequently, total control electric power is smaller than needed in a conventional arrangement.

The FIG. 15 arrangement can be applied to the embodiment of FIG. 13, to the embodiment of FIG. 12, or to the current control type magnetic amplifier constant voltage power supply of FIG. 11 with the same advantageous effects being obtained.

Figure 19:
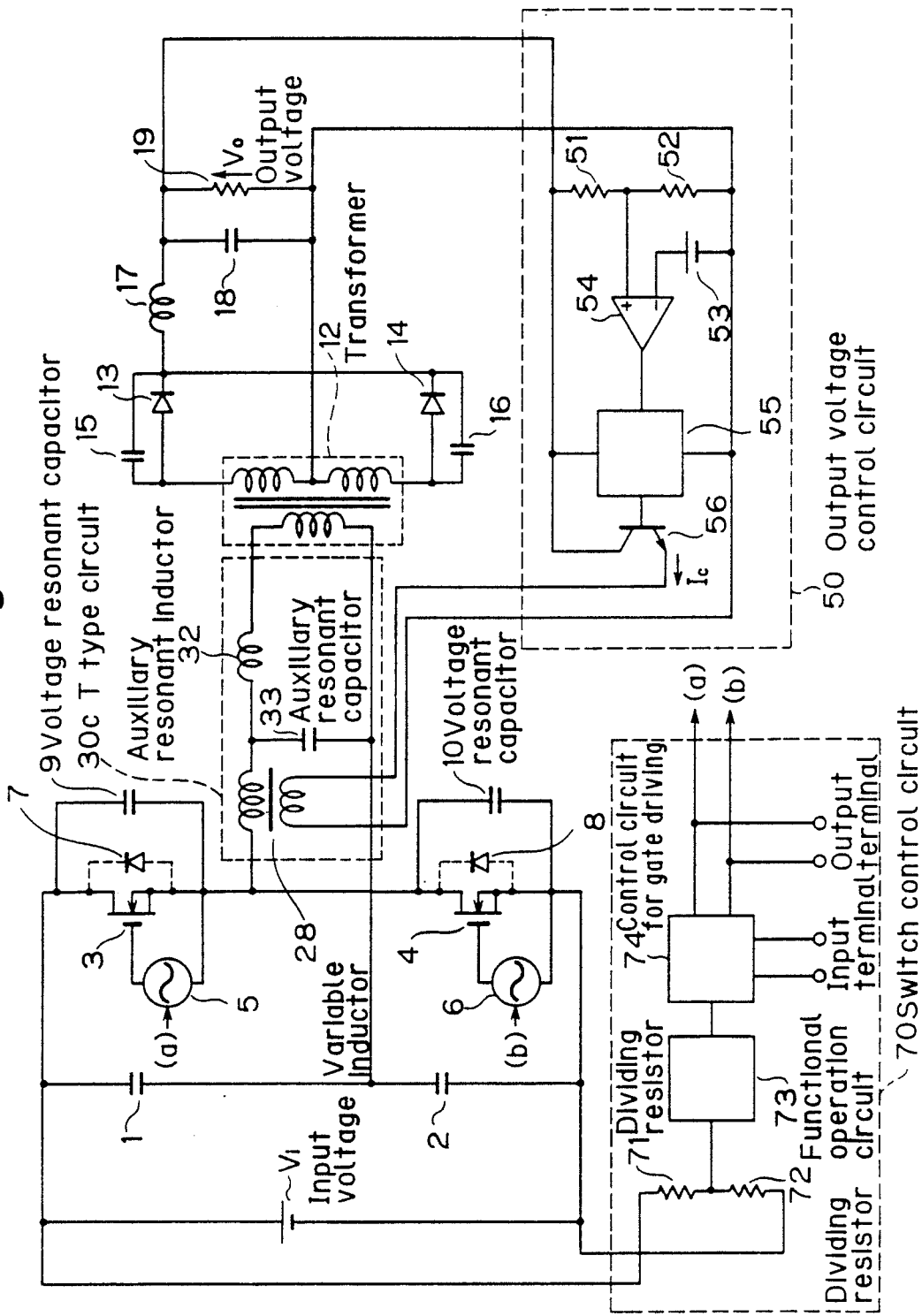
FIG. 19 is a circuit diagram depicting an illustrative eighth embodiment of the invention.

FIG. 19 is different from the embodiment of FIG. 12 in that in FIG. 19, a switch control circuit 70 is provided for varying the ON time of MOSFETS 3,4 in accordance with changes in input voltage. Switch control circuit 70 comprises dividing resistors 71, 72 connected in series to both ends of the input voltage Vi, a functional operation circuit 73 for effecting a functional operation on the output voltages divided by dividing resistors 71,72, and a gate driving control circuit 74 for controlling the ON time of MOSFETS 3,4 on the basis of the ouput from functional operation circuit 73. A terminal IN of gate driving control circuit 74 is used during parallel operation and serves to fetch a gate signal from the outside. When terminal IN is used, signals transmitted from dividing resistors 71,72 to gate driving control circuit 74 are cut off, and input signals from terminal IN are outputted intact from gate driving control circuit 74.

The operational steps of FIG. 19 which differ from those of the FIG. 12 embodiment will now be described. In FIG. 19, input voltage Vi is split by dividing resistors 71,72 of switch control circuit 70. The divided output voltages are, after undergoing an arithmetic operation by functional operaation circuit 73, converted into an ON switching time Ton of MOSFETS 3,4 by means of gate driving control circuit 74.

Turning to FIG. 20, there is shown the relationship between ON time Ton of switching and input voltage Vi, wherein ON time Ton becomes shorter as input voltage Vi increases. An output waveform of gate driving control circuit 74 is shown in FIG. 21, lines (1) and (2), and an OFF time Toff of switching is fixed under a resonant condition. Therefore, only ON time Ton of switching is varied by input voltage Vi. More specifically, if input voltage is large, the electrifying time of MOSFETS 3,4 is decreased for reducing energy transfer to the output side (see FIG. 21, line (1)). On the other hand, if the input voltage is small, the electrifying time is increased to augment the energy transfer (see FIG. 21, line (2)). In this manner, the dependency of output voltage Vo on variations in input voltage is lessened.

A resonant condition of T type circuit 30 of the embodiment of FIG. 12 is typically designed by use of a representative value of an input specification. For this reason, if input voltage Vi fluctuates more than the set value in equation (12), inductance Lr of variable inductor 28 greatly varies due to control over output voltage Vo, with the result that the auxiliary resonant condition (as stated in equation (5)) is no longer existent. The load dependency of output voltage is not diminished. Thus, the variation range of inductance Lr of variable indutor 28, due to the load fluctuations, becomes considerably wider than in the case of setting the auxiliary resonant condition, and it follows that quick response of the output voltage control to sharp variations in load is adversely affected. The FIG. 19 embodiment advantageously resolves this problem.

As shown in FIG. 21, when changing the ON switching time Ton, the switching frequency fs is also changed. However, variations in the switching frequency fs, needed for controlling the output voltage Vo in association with the variations in input voltage, are remarkably small, and the above auxiliary resonant condition in equation (5) is not upset even when providing switch control circuit 70. Hence, if the provision of switch control circuit 70 causes the changes in input voltage, it is possible to sufficiently reduce the load dependency of output voltage Vo, thereby improving the transient response and decreasing the variation width of variable inductor 28.

The current control type magnetic amplifier constant voltage power supply of FIG. 11 may also >be provided with an output voltage control circuit and a switch control circuit. The influence, caused by fluctuations in input voltage, on the output voltage is lessened by controlling the ON switching time of the MOSFET switch according to the input voltage, and the variation width of inductance of the mangetic amplifier, which is required for controlling the output voltage is also narrowed.

In accordance with the embodiment of FIG. 13, a switch control circuit is provided, and the ON switching time of the MOSFET switch is controlled corresponding to the input voltage, thereby reducing the influence on the output voltage caused by fluctuations in input voltage. Also, it is feasible to diminish the variation width of inductance of the variable inductor which is required for controlling the output voltage.

In the first through eighth embodiments depicted in FIGS. 4–19, the MOSFETS are used as semiconductor switches 3,4. However, other types of switching elements can also used.

Next, the variable inductors used in the sixth through eighth embodiments of FIGS. 12–19, will now be explained with reference to FIGS. 22–29(4).

Figure 22:
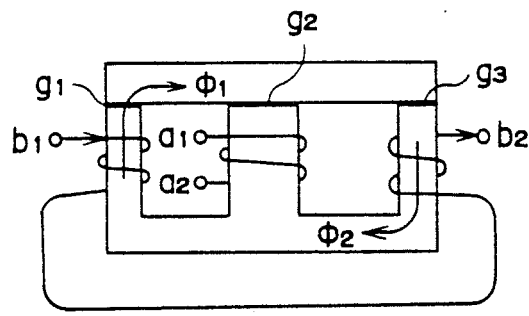
FIG. 22 is a block diagram depicting a conventional variable inductor.

FIG. 22 depicts a prior art type variable inductor where winding a1–a2 serves as a control winding and winding b1–b2 serves as an inductor winding. Magnetic fluxes generated by a current flowing through inductor winding b1–b2, wound separately on two magnetic path members, act in opposite directions with respect to the magnetic path member along which control winding a1–a2 is wound, and are thereby offset by each other, thus resulting in no generation of voltage in control winding a1–a2. Therefore, it is possible to reduce interference of control winding a1–a2 and of inductor winding b1–b2. If the current flowing through inductor winding b1–b2 becomes large, however, the core is saturated by this current. To prevent saturation, as shown in FIG. 22, air gaps g1, g2, g3 are used. When the air gaps g1,g2,g3 are increased in width, the control current required to cause core saturation increase so that large driving power is needed. Hence, the widths of the air gaps are practically limited to small values. If a large current flows in inductor winding b1–b2, use is limited because of saturation.

Figure 23:
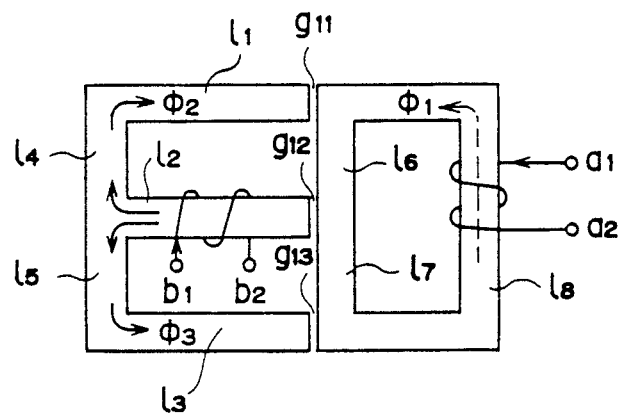
FIG. 23 is a block diagram depicting a illustrative variable inductor used in the invention.

The embodiments of FIGS. 23-etc deal with such a problem. The control characteristics of the switching power supply to which the invention pertains, are improved by providing a variable inductor which uses only a small amount of control power, which reduces likelihood of saturation from the inductor winding, and which facilitates saturation by the control winding. The improvement arises from the novel design of circuitry and core structure.

FIG. 23 depicts a variable inductor wherein magnetic path members 16–18 are combined to shape a first magnetic path closed in a rectangular shape. Winding a1–a2, used as a control winding, is wound along magnetic path member 18. Magnetic path members 11–15 are combined to form an E-shaped second magnetic path. The ends of the three magnetic path members 11–13, having an E-like configuration, are connected via air gaps g11–g13 to magnetic path members 16–17 consitituting the first magnetic path. As a result, magnetic path member 12 is used in common and a pair of symmetric closed magnetic paths are formed on both sides thereof. Winding b1–b2, used as an inductor winding, is wound along magnetic path member 12.

With this arrangement, the closed magnetic path formed by magnetic path members 16–18 is, when viewed from the control winding a1–a2, formed with no air gap, and saturation is effected by use of only a small amount of current. On the other hand, when viewed from the inductor winding b11 ∝ b2, a passage through the air gaps g11–g13 is invariably made when providing a closed magnetic path formed by magnetic path members 12–14–11–16–12; and a closed magnetic path formed by magnetic path members 12–15–13–17–12. Consequently, a large current is needed for saturating the closed magnetic path comprising magnetic path members 11–17. In other words, even when a considerably large current flows in inductor winding b1–b2, it is feasible to make it difficult to saturate the closed magnetic path, formed by magnetic path members 11–17, by adjusting the widths of air gaps g11–g13. The magnetic fluxes generated by the current flowing through control winding a1–a2 gradually cause the saturation of magnetic path members 16 and 17, at which time the magnitude of magnetic resistance of the closed magnetic path formed by magnetic path members 12–14–11–16–12 or by magnetic path members 12–15–13–17–12, is increased. The inductance, when viewed from the inductor winding b1–b2, is reduced.

Figure 24:
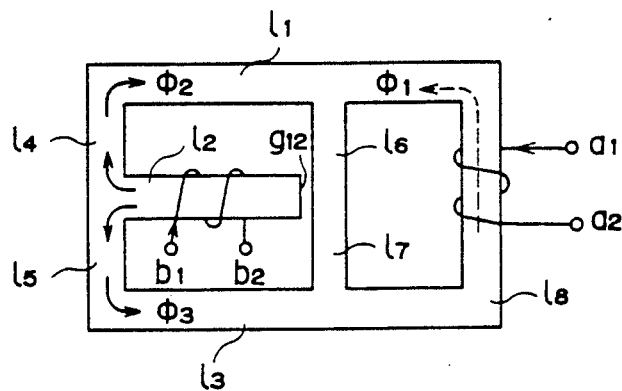
FIG. 24 is a block diagram depicting a variation of the variable inductor of FIG. 23.

As depicted, the difference between the embodiments of FIGS. 24 and 23 is that in FIG. 24, the air gap is formed only at the end of magnetic path member 12 located in the middle of the E-shaped structure, whereas in FIG. 23, there are air gaps formed at the ends of all three legs of the E-shaped structure. As compared with FIG. 23, the proportion of the magnetic path members to be saturated increases, thereby making it possible to enlarge the variations in inductance.

Figure 25:
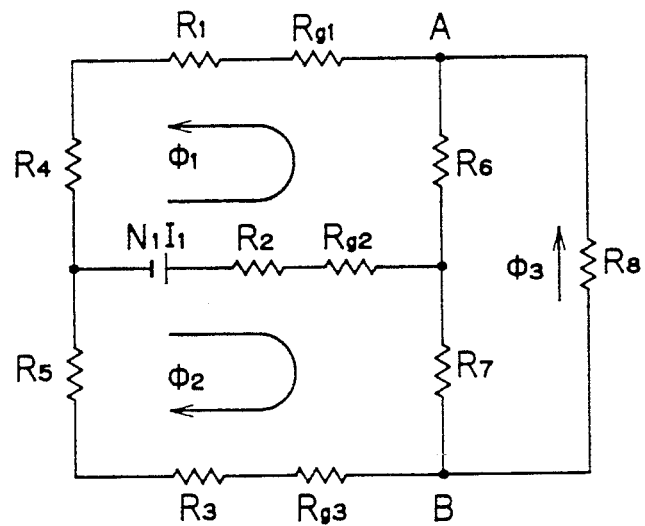
FIG. 25 is an equivalent circuit diagram of the inductor of FIGS. 23 and 24, taken in the direction of the inductor winding.
Figure 26:
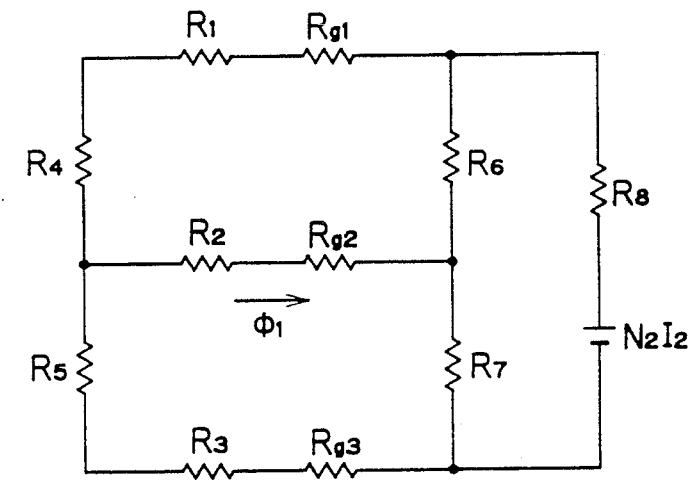
FIG. 26 is an equivalent circuit diagram of the inductor of FIGS. 23, and 24, taken in the direction of the control winding.

FIGS. 25 and 26 are equivalent circuits viewed from the inductor winding b1–b2 and the control winding a1–a2, respectively, in FIGS. 23 and 24. Note that throughout FIGS. 25 and 26, the subnumerals represent components which correspond to thos of FIG. 23. In the case of FIG. 24, the following relationship is set.

Air gap magnetic resistance $Rg1 = Rg2 = 0$

Referring to FIGS. 25 and 26, magnetic resistances Ri, wherein i=1 to 8, at the respective magnetic path members are given by $$R_i = d_i/\mu_i S_i \quad (15)$$

wherein $d_i$ is the effective magnetic path length, $S_i$ is the effective cross sectional area, and $\mu_i$ is the magnetic permeability. Magnetic resistances $R_{gi}$, wherein $i=1$ to 3, of the air gaps are given by $$R_{gi} = d_{gi}/\mu_0 S_{gi} \quad (16)$$

wherein $d_{gi}$ is the width of each air gap and $S_{gi}$ is the cross sectional area, and $\mu_0$ is magnetic permeability.

Figure 27:
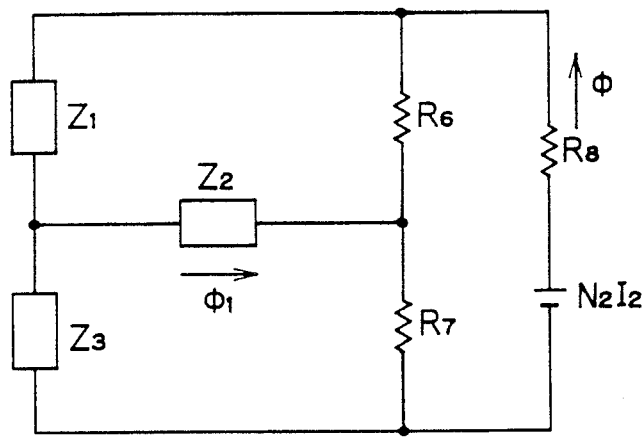
FIG. 27 is a simplified equivalent circuit diagram of FIG. 26.

FIGS. 25 and 26 are equivalent circuit diagrams showing magnetic resistances $R_i$ and $R_{gi}$, and FIG. 27 is a simplified equivalent circuit diagram of FIG. 26. In the equivalent circuit diagram of FIG. 25, when viewed from inductor winding b1-b2, $$R1 + Rg1 + R4 = R3 + Rg3 + R5 \quad (17)$$
$$R6 = R7$$

If this equation is established, i.e. when symmetric with respect to the magnetic path member 12, magnetic fluxes $\phi_1$ and $\phi_2$ generated by a magnetomotive force NIII are equalized, thereby causing no magnetic flux $\phi_3$, passing through magnetic resistance R8 between two points A and. B. Namely, no interference is caused to control winding a1-a2 by inductor winding b1-b2.

On the other hand, in the equivalent circuit diagram of FIG. 26, when viewed from the control winding a1-a2, $$Z1 = R1 + Rg1 + R4$$
$$Z2 = R2 + Rg2$$
$$Z3 = R3 + Rg3 + R5 \quad (18)$$

When equations (18) are satisfied, magnetic flux $\phi_1$ of magnetic path member 12 is calculated by the following $$\phi_1 = (N2I2 - R8\phi) \cdot (R6Z3 - Z1R7)/\Delta$$

$$\Delta = \begin{vmatrix} Z1 + Z3 & 0 & -Z3 \\ 0 & R6 + R7 & R7 \\ Z1 & -R6 & Z2 \end{vmatrix} \quad (19)$$

Hence, $$R6Z3 - Z1R7 = 0 \quad (20)$$

Namely, when satisfying an equation such as $R6Z3 = Z1R7$, $\phi_1 = 0$, no magnetic flux is generated in the magnetic path member 12. Thus, no interference with inductor winding b1-b2 is caused by control winding a1-a2.

At this time, the magnetic resistance when viewed from the control winding a1-a2, is expressed as $$\begin{aligned} R &= R8 + (R6 + R7)/(Z1 + Z3) \\ &= R8 + (R6 + R7) \cdot (Z1 + Z3)/(R6 + R7 + Z1 + Z3) \\ &= R8(R6 + R7)/[1 + (R6 + R7)/(Z1 + Z3)] \end{aligned} \quad (21)$$

If Z1 and Z3 contain air gaps therein (corresponding to FIG. 23), generally the following relationship holds.

$$Z1 + Z3 >> R6 + R7 \quad (22)$$

and $$R \approx R8 + R6 + R7 \quad (23)$$

The magnetic resistance R includes no resistance of the air gap, and has a small value, so that larger magnetic flux can be produced by a smaller control signal. If Z1 and Z3 contain no air gap (corresponding to FIG. 24), the magnetic resistance R does not include the air gap and similary has a small value. On the other hand, magnetic resistance $Rg2$ of the air gap is invariably included in the magnetic resistance when viewed from the inductor winding b1-b2. Thus, the magnetic resistance R is increased by arbitrarily determining the air gap width dg2, and accordingly it is then possible to prevent core saturation even when applying a large magnetomotive force NIII.

Figure 28:
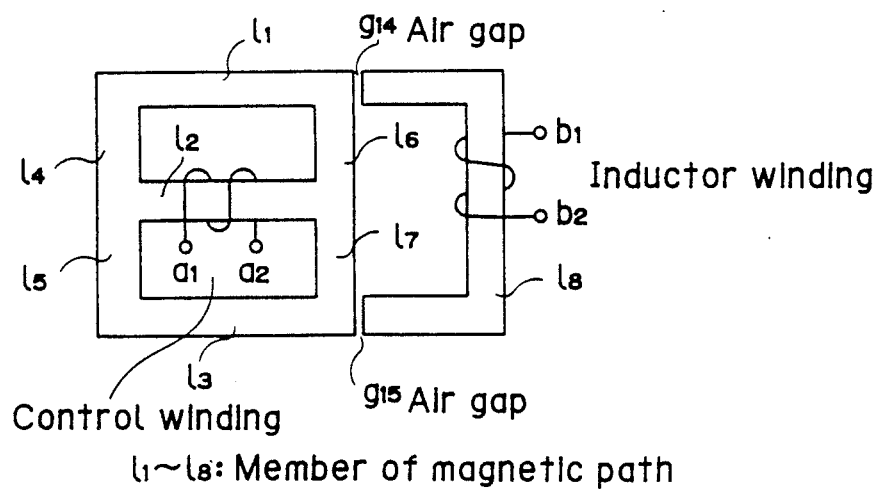
FIG. 28 is a block diagram depicting another variable inductor used in the invention.
Figure 29:
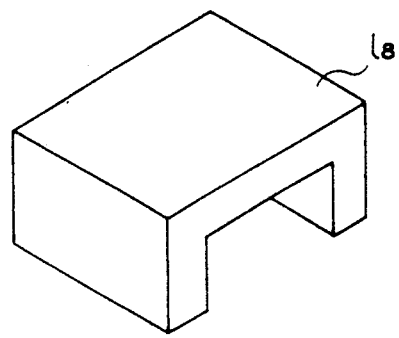
FIGS. 29(A)–29(D), are block diagrams depicting further variations in the variable inductor of FIG. 24.
Figure 29:
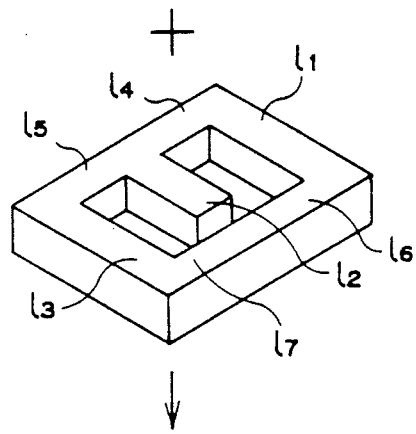
Figure 29:
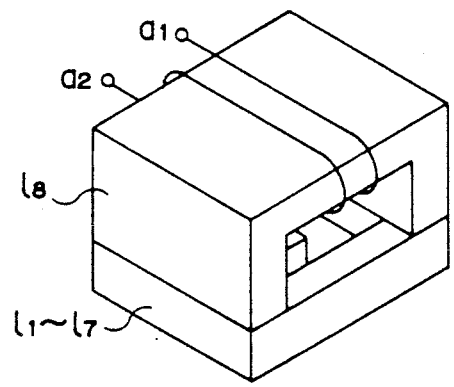
Figure 29:
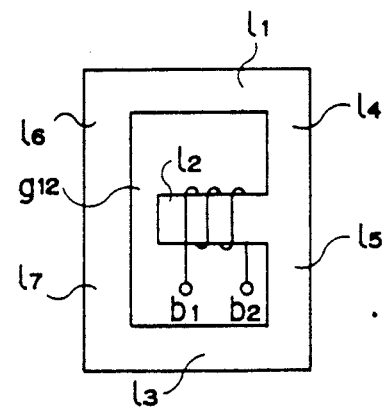

FIG. 28 depicts another variable inductor wherein a pair of symmetric E-shaped closed magnetic paths are formed of the magnetic path members 12-14-11-16-12 and 12-15-13-17-12, which are provided in symmetry with respect to magnetic path member 12. Winding a1-a2, used as a control winding, is wound along the magnetic path member 12. A magnetic path member 18, assuming a substantially U-shape, is connected via air gaps g14 and g15 to the magnetic path members and 16 and 17, thus forming a closed magnetic path. The magnetic path member 18 is , as shown in FIG. 28, wound with winding b1-b2, used as an inductor winding, whereby, as in the case with FIG. 23, saturation can be easily produced by use of control winding a1-a2, but is hard to effect using inductor winding b1-b2.

Referring to FIG. 23, a practicable arrangement involves the rectangularly shaped first magnetic path being connected to the E-shaped second magnetic path with no air gap. In this case, the control winding and the inductor winding may be wound along the magnetic path members on either side.

FIGS. 29(A)-29(D) illustrate an embodiment which the combined magnetic path of the variable inductor of FIG. 24 is changed. A substantially U-shaped magnetic path 18 shown in FIG. 29(A) is, as illustrated in FIG. 29(C), combined one on top of the other with EI-shaped magnetic paths 11-17 shown in FIG. 29(B). This configuration is advantageous when a mounting area on, e.g. a printed board, is limited. Also, the area of the core, wound with the control winding, can be set to be large, whereby a larger radiation area of the core is obtained. FIG. 29(D) is a bottom view of FIG. 29(C), wherein an air gap g12 is formed only in the magnetic path member 12. The configuration , however, is not limited to that shown. Air gaps may be formed at the respective ends of the three magnetic path members 11, 12 and 13, which cooperate to assume an E-shaped configuration. Also, the configuration may be formed without any air gaps.

The switching power supply of the invention has many advantages. For example, use of the T type circuit eliminates the dependency of the output voltage on fluctuations in the load, as a result of which only the dependency of output voltage on fluctuation in the input voltage remains. Hence, the control range of the output voltage can be narrowed. Further advantages to this arrangement are (1) stability is obtained with respect to sharp variations in the load; (2) designing of the feedback loop is facilitated; (3) the inter-output interference is reduced even in the case of multiple output power supplies; and (4) the variable width of frequency is diminished so as to change the switching frequency.

Another advantage is that one of the two inductors comprises the use of leakage inductance of the transformer, and the capacitor in the T type circuit may comprise use of the winding capacitance of the transformer. This arrangement eliminates the necessity for the use in the T type circuit of a separate capacitor and two separate inductors. Therefore, this arrangement has the further advantages of reducing the number of components, improving reliability and enabling miniaturization of the arrangement.

A further advantage is that by providing a variable inductor and output voltage control circuit, the output voltage can be controlled at a constant level while keeping the switching frequency constant. Hence, further advantages which accrue to this arrangement are (1) the output filter can be miniaturized by increasing the switching frequency; (2) the output filter may be designed in accordance with the switching frequency to filter out adverse noises; and (3) provision can be made to prevent production of beads and to prevent lead in operation between power supplies when using a plurality of power supplies in parallel.

A still further advantage is that since output control is effected while changing inductance, the control circuit can be simplified to improve reliability of the power supply, and the control circuit can be effectively insulated.

A yet further advantage is that since fluctuations in input voltage are absorbed by providing an input feedforward loop, it is possible to reduce the variation range of the variable inductor for the output feedback and to improve the transient response; and the amount of control power required for the output feedback can be decreased.

A further advantage is that since the variation width of inductance needed for output control is diminished by providing a switch control circuit for controlling the switching ON time of the semiconductor switch in accordance with the input voltage, the transient characteristics of the output control can be improved, and the variable inductor can be readily miniaturized.

Another advantage is that since the RMS value of the current flow in the dividing capacitors can be decreased by providing a resonant capacitor between the connecting point of the dividing capacitors for halving the input voltage and another connecting point of the semiconductor switches, a small sized capacitor, having a small allowable ripple current, is usable so that the power supply can be more readily miniaturized, and only a single resonant capacitor need be used so that reliability is improved.

A still further advantage is that since the variable inductor has a larger value of magnetic resistance when viewed from the inductor winding as compared with the magnetic resistance when viewed from the control winding, saturation of the core using the inductor winding difficult to obtain whereas with the control winding saturation is easier to obtain; and hence, the control current for changing inductance can be reduced, and the speed of response to-variations in inductance is increased because only a small number of ampere turns of the control winding is needed; and furthermore, the lead wire resistance, the inductance and parallel capacitance can be decreased.

The foregoing description is ilustrative of the principles of the invention. Numerous extensions and modifications thereof would be apparent to the worker skilled in the art. All such extensions and modifications are to be considered to be within the spirit and scope of the invention.

What is claimed is:

1. A switching power supply for controlling an output voltage to a constant value with respect to fluctuations in input or in load, comprising
   a DC power supply having two ends;
   two dividing capacitors connected in series to both ends of said DC power supply;
   two semiconductor switches connected in series to both ends of said DC power supply;
   a transformer comprising a primary winding having two ends and a secondary winding having two ends, one end of said primary winding being connected to a connecting point of said two dividing capacitors; and
   a T type circuit comprising
   two resonant inductors connected in series between a connecting point of said two semiconductor switches and another end of said primary winding, and
   a resonant capacitor connected between a connecting point of said two resonant inductors and said other end of said primary winding.

2. A switching power supply for controlling an output voltage to a constant value with respect to fluctuations in input or in load, comprising
   a DC power supply having two ends;
   two dividing capacitors connected in series to both ends of said DC power supply;
   two semiconductor switches connected in series to both ends of said DC power supply;
   a transformer comprising a primary winding having two ends and a secondary winding having two ends, both ends of said primary winding being connected between a connecting point of said two dividing capacitors and a connecting point of said two semiconducting switches; and
   a T type circuit comprising
   two resonant inductors connected in series to one end of said secondary winding;
   a resonant capacitor connected between a connecting point of said two resonant inductors and the other end of said secondary winding.

3. The power supply of claim 1 or 2, further comprising two resonant capacitors connected in parallel to said two semiconductor switches, respectively.

4. The power supply of claim 1 or 2, further comprising a resonant capacitor between the connecting point of said two dividing capacitors and the connecting point of said two semiconductor switches, to generate a loop current between said resonant capacitor and said T type circuit when turning OFF said two semiconductor switches.

5. The power of claim 1 or 2, wherein one of said two inductors of said T type circuit comprises a variable inductor, and wherein a reference voltage is produced, and further comprising an output voltage control circuit for increasing and decreasing a control current applied to said variable inductor, in accordance with the difference between an output voltage of said power supply and said reference voltage, said control current serving to change inductance of said variable inductor to control the output voltage to a constant value.

6. The power supply of claim 1 or 2, wherein said two inductors of said T type circuit each comprises a variable inductor, and wherein a reference voltage is produced, and further comprising an output voltage control circuit for increasing and decreasing a control current applied to any one of said two variable inductors in accordance with the difference between an output voltage of said power supply and said reference voltage, and an input voltage control circuit for increasing and decreasing a control current to another of said two variable inductors in accordance with an input voltage, said two control currents serving to change inductances of said two variable inductors to control the output voltage to a constant value.

7. The power supply of claim 1 or 2, further comprising a switch control circuit comprising two dividing resistors connected in series to both ends of said DC power supply, a functional operation circuit for effecting a functional operation on an output voltage of said power supply as divided by said two dividing resistors, and a gate driving control circuit for controlling the ON switching time of said two semiconductor switches on the basis of an output of said functional operation circuit, thereby diminishing the varaition width of inductance of one of said two variable inductors to control the output voltage.

8. The power supply of claim 1 or 2, wherein at least one of said two inductors of said T type circuit is a variable inductor comprising a plurality of magnetic path members, a first closed magnetic path formed by at least one of said plurality of magnetic path members and forming a rectangular shape, a control winding wound along said at least one magnetic path member forming said first closed magnetic path, an E-shaped second magnetic path comprising three of said plurality of magnetic path members connected via air gaps to all ends of said three magnetic path members wound with no winding of a first magnetic path or to only one end of a middle one of said three magnetic path members, or connected via no air gap thereto, and an inductor winding wound along said middle one of said three magnetic path members.

9. The power supply of claim 1 or 2, wherein at least one of said two inductors of said T type circuit is a variable inductor comprising an EI-shaped first closed magnetic path, a control winding along a part of said first closed magnetic path, a substantially U-shaped second magnetic path comprising two magnetic portions connected via an air gap or no air gap to another portion of said first closed magnetic path, and an inductor winding wound on said second magnetic path.

* * * * *